United States Patent
Abe et al.

(10) Patent No.: US 12,458,313 B2
(45) Date of Patent: Nov. 4, 2025

(54) DIAGNOSTIC SUPPORT PROGRAM

(71) Applicants: PARAMEVIA PTE. LTD., Singapore (SG); MEDIOTT CO., LTD., Tokyo (JP)

(72) Inventors: Takehiko Abe, Tokyo (JP); Norifumi Yoshida, Chiba (JP)

(73) Assignees: PARAMEVIA PTE. LTD., Singapore (SG); MEDIOTT CO., LTD., Tokyo (JP)

( * ) Notice: Subject to any disclaimer, the term of this patent is extended or adjusted under 35 U.S.C. 154(b) by 1195 days.

(21) Appl. No.: 16/959,497

(22) PCT Filed: Jan. 7, 2019

(86) PCT No.: PCT/JP2019/000102
§ 371 (c)(1),
(2) Date: Jul. 1, 2020

(87) PCT Pub. No.: WO2019/135412
PCT Pub. Date: Jul. 11, 2019

(65) Prior Publication Data
US 2021/0052228 A1    Feb. 25, 2021

(30) Foreign Application Priority Data

Jan. 5, 2018  (JP) .................................. 2018-000855
Mar. 9, 2018  (JP) .................................. 2018-043511

(51) Int. Cl.
*A61B 6/00*    (2024.01)
*A61B 5/00*    (2006.01)
(Continued)

(52) U.S. Cl.
CPC ............ *A61B 6/5264* (2013.01); *A61B 5/004* (2013.01); *A61B 5/7257* (2013.01);
(Continued)

(58) Field of Classification Search
CPC ..... A61B 6/5264; A61B 6/5217; A61B 5/004; A61B 5/7257; A61B 5/7275; G16H 50/20;
(Continued)

(56) References Cited

U.S. PATENT DOCUMENTS 6,577,752 B2    6/2003  Armato et al.
6,813,375 B2    11/2004 Armato, III et al.
(Continued)

FOREIGN PATENT DOCUMENTS

CN    102949240 A    3/2013
CN    106175766 A    12/2016
(Continued)

OTHER PUBLICATIONS

CA Office Action issued in SA patent application No. 3087702, Canada, Aug. 2, 2023, 4 pages.
(Continued)

*Primary Examiner* — Khai M Nguyen
(74) *Attorney, Agent, or Firm* — ASLAN LAW, P.C.

(57) ABSTRACT

Provided is a diagnostic support program that is possible to display a movement of an area whose shape changes for each respiratory element including all or part of expired air or inspired air.
There are provided processing of acquiring a plurality of frame images from a database that stores images, processing of specifying of a cycle of a respiratory element including all or part of expired air or inspired air based on pixels in a specific area in each of the frame images, processing of detecting a lung field based on the cycle of the specified respiratory element, processing of dividing the detected lung field into a plurality of block areas and calculating a change in image in a block area in each of the frame images, processing of Fourier-transforming a change in image in
(Continued)

each block area in each of the frame images, processing of extracting a spectrum in a fixed band including a spectrum corresponding to the cycle of the respiratory element, out of a spectrum obtained after the Fourier-transforming, processing of performing inverse Fourier transform on the spectrum extracted from the fixed band, and processing of displaying each of the images after performing the inverse Fourier transform, on a display.

12 Claims, 19 Drawing Sheets

(51) Int. Cl.
  *G06T 7/00* (2017.01)
  *G16H 50/20* (2018.01)
(52) U.S. Cl.
  CPC .......... *A61B 5/7275* (2013.01); *A61B 6/5217* (2013.01); *G06T 7/0012* (2013.01); *G16H 50/20* (2018.01); *G06T 2207/30061* (2013.01); *G06T 2207/30101* (2013.01); *G06V 2201/031* (2022.01)
(58) Field of Classification Search
  CPC ......... G06T 7/0012; G06T 2207/30061; G06T 2207/30101; G06V 2201/031
  See application file for complete search history.

(56) References Cited

U.S. PATENT DOCUMENTS

| | | | |
|---|---|---|---|
| 8,103,117 B2 | 1/2012 | Takahashi | |
| 9,064,302 B2 | 6/2015 | Muraoka et al. | |
| 9,801,555 B2 | 10/2017 | Noji | |
| 9,947,093 B2 | 4/2018 | Tsunomori et al. | |
| 10,242,445 B2 | 3/2019 | Tsunomori et al. | |
| 10,297,012 B2 | 5/2019 | Futamura et al. | |
| 11,004,201 B2* | 5/2021 | Abe ........................ | G16H 10/60 |
| 2002/0191827 A1 | 12/2002 | Armato et al. | |
| 2003/0086599 A1 | 5/2003 | Armato, III et al. | |
| 2004/0260188 A1* | 12/2004 | Syed ........................ | A61B 7/04 |
| | | | 600/509 |
| 2008/0253679 A1 | 10/2008 | Takahashi | |
| 2013/0156267 A1 | 6/2013 | Muraoka et al. | |
| 2013/0331725 A1 | 12/2013 | Noji et al. | |
| 2015/0065817 A1 | 3/2015 | Noji | |
| 2015/0077432 A1 | 3/2015 | Toyama et al. | |
| 2016/0035092 A1 | 2/2016 | Strommer et al. | |
| 2016/0189394 A1 | 6/2016 | Zhang et al. | |
| 2016/0349345 A1 | 12/2016 | Park et al. | |
| 2017/0287114 A1* | 10/2017 | Futamura ............... | A61B 6/541 |
| 2017/0323440 A1* | 11/2017 | Tsunomori ............. | G06T 7/13 |
| 2018/0026855 A1 | 1/2018 | Ji | |
| 2018/0197289 A1 | 7/2018 | Tsunomori et al. | |
| 2018/0197290 A1* | 7/2018 | Kasai ...................... | G06T 7/74 |
| 2019/0287248 A1* | 9/2019 | Abe ......................... | G06T 7/11 |

FOREIGN PATENT DOCUMENTS

| | | |
|---|---|---|
| EP | 2 674 912 A1 | 12/2013 |
| JP | S63-240832 A | 10/1988 |
| JP | 2008-219654 A | 9/2008 |
| JP | 2010-187723 A | 9/2010 |
| JP | 2012-000297 A | 1/2012 |
| JP | 2012-110397 A | 6/2012 |
| JP | WO 2012/026145 A1 | 10/2013 |
| JP | 2014-050756 A | 3/2014 |
| JP | 2014-128687 A | 7/2014 |
| JP | 2015-043880 A | 3/2015 |
| JP | 5874636 B2 | 3/2016 |
| JP | 2016-047294 A | 4/2016 |
| JP | 5907185 B | 4/2016 |
| JP | 2016-214725 A | 12/2016 |
| JP | 2017-113344 A | 6/2017 |
| JP | 2017-124325 A | 7/2017 |
| JP | 2017-131310 A | 8/2017 |
| JP | 2017-176400 A | 10/2017 |
| JP | 2017-200565 A | 11/2017 |
| JP | 2017-217047 A | 12/2017 |
| WO | 2013/150911 A | 10/2013 |

OTHER PUBLICATIONS

EPO, EPSR issued in EP patent application No. 19 736 110.8, Germany. Oct. 2, 2021.10 pages.

CN Office Action issued in CN patent application No. 201980016993. 2, The State Inntellectual Property Office of People's Republic of China, China, Nov. 28, 2023, 8 pages.

AU Office Action issued in AU patent application No. 2019205878, Australian Government, IP Australia, Australia, Nov. 30, 2023, 4 pages.

AE Office Action issued in AE patent application No. P6000995/ 2020, United Arab Emirates, Dec. 18, 2023, 12 pages.

Taiwanese (TW) Office Action issued in TW patent application No. 108107931, Feb. 6, 2023, Taiwan, 20 pages.

Japanese (JP) Patent Office, JP Office Action issued in JP patent application No. 2022-141459, Feb. 7, 2023, Japan, 4 pages.

SA Office Action issued in SA patent application No. 520412387, Saudi Authority for Intellectual Property, the Kingdom of Saudi Arabia (SA), May 3, 2023, 13 pages.

IN Office Action issued in IN patent application No. 202047032660, India, issued on Jul. 14, 2022, 5 pages.

JP Office Action issued in JP patent application No. 2022-066013, JPO, Japan, Aug. 17, 2022 (date of drafting), issued on Aug. 23, 2022, 5 pages.

Saudi Authority (SA) for Intellectual Property, SA Office Action issued in SA patent application No. 520412387, Sep. 14, 2022, 11 pages.

African Regional Intellectual Property Organization (ARIPO, AP Office Action issued in AP patent application No. AP/P/2020/ 012577, Sep. 6, 2022, 6 pages.

Japanese (JP) Patent Office, JP Office Action issued in JP patent application No. 2022-141459, Nov. 15, 2022, 3 pages.

Japanese (JP) Patent Office, JP Office Action issued in JP patent application No. 2019-563986, Dec. 13, 2022, 4 pages.

"Basic Imaging Properties of a Large Image Intensifier-TV Digital Chest Radiographic System" A journal of Clinical and Laboratory Research, Investigative Radiology V22 No. 4 Apr. 1987. Philadelphia PA USA. pp. 328-335.

Rie Tanaka "Dynamic chest radiography: flat-panel detector (FPD) based functional X-ray imaging" Japanese Society of Radiological Technology and Japan Society of Medical Physics. Published online: Jun. 13, 2016. Japan. pp. 139-153.

Abe et al. "Evaluation of pulmonary blood flow using new method of Dynamic X-ray Examination; comparison with 99mTc-MAA perfusion scintigraphy" Japan Anti-Tuberculosis Association Fukujyuji Hospitl. Japan. 18 pages.

Yamada et al. "Difference in diaphragmatic motion during tidal breathing in astanding position between COPD patients and normal subjects:Time-resolved quantitative evaluation using dynamic chestradiography with flat panel detector system ('dynamic X-rayphrenicography')" European Journal of Radiology 87 (2017) pp. 76-82.

Yamada et al. "Time-Resolved Quantitative Analysis of the Diaphragms During Tidal Breathing in a Standing Position Using Dynamic Chest Radiography with a Flat Panel Detector System ('Dynamic X-Ray Phrenicography'): Initial Experience in 172 Volunteers" Academic Radiology, vol. 24, No. 4, Apr. 2017. 8 pages.

JP Office Action issued in JP patent application No. 2022-066013, JPO, Japan, May 26, 2022, 6 pages.

JP Office Action issued in JP patent application No. 2019-563986, JPO, Japan, May 30, 2022, 6 pages.

Takayuki Kitasaka, Lung Area Extraction from 3-D Chest X-Ray CT Images Using the Shape Model Generated by Valiable Bezier

(56) References Cited

OTHER PUBLICATIONS

Surface, The Transactions of the Institute of Electronics, Information and Communication Engineers, Jan. 2000, D-II vol. J83-D-II No. 1, pp. 165-174.
KR Office Action issued in KR patent application No. 10-2020-7021913, Korea, Korean Intellectual Property Office, Oct. 13, 2023, 6 pages.
MX Office Action issued in MX patent application No. MX/a/2020/006984, Mexico, Feb. 12, 2024, 9 pages.
JP Office Action issued in JP patent application No. 2023-126624, Japan Patent Office (JPO), Japan, Jun. 25, 2024, 8 pages.
AP Office Action issued in AP patent application No. AP/P/2020/012577, ARIPO, Zimbabwe, Jul. 30, 2024, 6 pages.
CA Office Action issued in AP patent application No. CA/ 3,087,702, CIPO, Canada, May 23, 2024, 3 pages.
MY Office Action issued in MY patent application No. MY/PI2020003457, MYIPO, Malaysia, Oct. 2, 2024, 4 pages.
KR Office Action issued in KR patent application No. KR/10-2020-7021913, KIPO, Korea, Jul. 25, 2024, 6 pages.
AP Office Action issued in AP patent application No. AP/P/2020/012577, Aripo, Zimbabwe, Sep. 6, 2022, 6 pages.
JP Office Action issued in JP patent application No. 2022-141459, Jpo, Japan, Nov. 15, 2022, 3 pages.
KR Office Action issued in KR patent application No. 10-2020-7021913, KIPO, Korean, Oct. 13, 2023, 6 pages.
IMPI (Mexican Institute of Industrial Property), Office Action issued in MX patent application No. MX/a/2020/006984 on Feb. 26, 2025, Mexico (MX), 13 pages.
ARIPO (African Regional Intellectual Property Organization), Office Action issued in ARIPO patent application No. AP/P/2020/012577, May 8, 2025, Zimbabwe Africa, 14 pages.

* cited by examiner

DIAGNOSTIC SUPPORT PROGRAM

CROSS-REFERENCE TO RELATED APPLICATIONS

This application is a National Stage Entry of PCT/JP2019/000102 filed on Jan. 7, 2019. This application claims priority to JP Patent Application No. 2018-000855 filed on Jan. 5, 2018, and to JP Patent Application No. 2018-043511 filed on Mar. 9, 2018, and to PCT Application No. PCT/JP2019/000102 filed on Jan. 7, 2019, the entire contents of which are hereby incorporated by reference.

TECHNICAL FIELD

The present invention relates to a technique to analyze images of a human body and to display analysis results.

BACKGROUND ART

When a doctor diagnoses a lung by dynamic state images of a chest, it is important to observe time-series chest dynamic state images in which a subject is photographed in a natural respiratory state. A spirometer with which it is easy to acquire physiological data, an RI (Radio Isotope) inspection, a simple X-ray photography with which morphological data can be obtained, CT (Computed Tomography), or the like is known as a method of evaluating lung functions. However, it is not easy to acquire both physiological data and morphological data efficiently.

In recent years, attempted has been a method in which dynamic state images of the chest of a human body are photographed by making use of a semiconductor image sensor such as an FPD (Flat Panel Detector) or the like to be used for diagnosis. For example, Non-Patent Document 1 has disclosed a technique of generating a difference image indicating a difference in signal value between a plurality of frame images each constituting a dynamic state image to find and display a maximum value of each signal value from the difference image.

Further, Patent Document 1 has disclosed a technique of extracting a lung field area from each of frame images of a plurality of the respective frame images indicating the dynamic state of the chest of the human body, and dividing the lung field area into a plurality of small areas to perform an analysis by associating the divided small areas with each other, between a plurality of the frame images. According to this technique, a feature amount indicating a movement of the divided small area is displayed.

PRIOR ART DOCUMENT

Patent Document

Patent Document 1: Japanese Patent No. 5874636

Non-Patent Document

Non-Patent Document 1: "Basic Imaging Properties of a Large Image Intensifier-TV Digital Chest Radiographic System" Investigative Radiology: April 1987; 22: 328-335.

SUMMARY OF THE INVENTION

Problems to be Solved by the Invention

However, it is not easy for a doctor to grasp the state of a disease only by displaying the maximum value of a difference value between frames for each pixel of a dynamic state image as in the technique described in Non-Patent Document 1. Further, it is not sufficient to grasp the state of the disease only by displaying a feature amount as in the technique described in Patent Document 1. Consequently, it is desirable to display images in accordance with the state of respiration and lung blood vessels. That is, it is desirable to grasp the respiratory state and the entire blood vessel dynamic state of a human body as a subject, and to display the images each showing an actual movement, based on a tendency of change in waveform or frequency of respiration, a heart, and blood vessels or blood flows of a pulmonary hilum portion, or in image thereof.

The present invention has been made in view of such a situation and has an object to provide a diagnostic support program capable of displaying movement of an area where the shape changes for every respiratory element including all or part of expired air or inspired air. To be more specific, it is an object to generate images that assist a diagnosis by calculating numerical values that assist a diagnosis by digitizing the concordance rate or another non-concordance rate for the waveform and Hz already acquired for new target data to be measured and further by imaging these numerical values.

Means to Solve the Problems (1) In order to achieve the above-described object, the present application has taken steps as follows. That is, a diagnostic support program according to one aspect of the present invention is a diagnostic support program that analyzes images of a human body and displays analysis results, the program causing a computer to execute a process comprising processing of acquiring a plurality of frame images from a database that stores the images; processing of specifying at least one frequency of a respiratory element including all or part of expired air or inspired air based on pixels in a specific area in each of the frame images; processing of detecting a lung field based on the at least one frequency of the specified respiratory element; processing of dividing the detected lung field into a plurality of block areas and calculating a change in image in a block area in each of the frame images; processing of Fourier-transforming a change in image in each block area in each of the frame images; processing of extracting a spectrum in a fixed band including a spectrum corresponding to the at least one frequency of the respiratory element, out of a spectrum obtained after the Fourier-transforming; processing of performing inverse Fourier transform on the spectrum extracted from the fixed band; and processing of displaying each of the images after performing the inverse Fourier transform, on a display.

(2) Further, a diagnostic support program according to one aspect of the present invention has a feature of causing the computer to execute the process further comprising processing of extracting a spectrum in a fixed band that includes a frequency of noise and includes a spectrum corresponding to a frequency other than the frequency of the respiratory element obtained from each of the frame images, or an input frequency or a frequency band, out of the spectrum obtained after the Fourier-transforming, by using a filter.

(3) Further, a diagnostic support program according to one aspect of the present invention has a feature of causing the computer to execute the process further comprising processing of generating the image between the frames based on the frequency of the respiratory element and each of the frame images.

(4) Further, a diagnostic support program according to one aspect of the present invention is a diagnostic support program that analyzes images of a human body and displays analysis results, the program causing a computer to execute a process comprising processing of acquiring a plurality of frame images from a database that stores the images; processing of specifying at least one frequency of a cardiovascular beat element extracted from a heartbeat or a blood vessel beat of a subject; processing of specifying at least one frequency of a respiratory element including all or part of expired air or inspired air based on pixels in a specific area in each of the frame images; processing of detecting a lung field based on the at least one frequency of the specified respiratory element; processing of dividing the detected lung field into a plurality of block areas and calculating a change in image in a block area in each of the frame images; processing of Fourier-transforming a change in image in each block area in each of the frame images; processing of extracting a spectrum in a fixed band including a spectrum corresponding to the at least one frequency of the cardiovascular beat element, out of a spectrum obtained after the Fourier-transforming; processing of performing inverse Fourier transform on the spectrum extracted from the fixed band; and processing of displaying each of the images after performing the inverse Fourier transform, on a display.

(5) Further, a diagnostic support program according to one aspect of the present invention is a diagnostic support program that analyzes images of a human body and displays analysis results, the program causing a computer to execute a process comprising processing of acquiring a plurality of frame images from a database that stores the images; processing of specifying at least one frequency of a cardiovascular beat element extracted from a heartbeat or a blood vessel beat of a subject; processing of detecting a lung field; processing of dividing the detected lung field into a plurality of block areas and calculating a change in image in a block area in each of the frame images; processing of Fourier-transforming a change in image in each block area in each of the frame images; processing of extracting a spectrum in a fixed band including a spectrum corresponding to the at least one frequency of the cardiovascular beat element, out of a spectrum obtained after the Fourier-transforming; processing of performing inverse Fourier transform on the spectrum extracted from the fixed band; and processing of displaying each of the images after performing the inverse Fourier transform, on a display.

(6) Further, a diagnostic support program according to one aspect of the present invention has a feature of causing the computer to execute the process further comprising processing of extracting a spectrum in a fixed band that includes a frequency of noise and includes a spectrum corresponding to a frequency other than the frequency of the cardiovascular beat element obtained from each of the frame images, or an input frequency or a frequency band, out of the spectrum obtained after the Fourier-transforming, by using a filter.

(7) Further, a diagnostic support program according to one aspect of the present invention has a feature of causing the computer to execute the process further comprising processing of generating the image between the frames based on the frequency of the specified cardiovascular beat element and each of the frame images.

(8) Further, a diagnostic support program according to one aspect of the present invention is a diagnostic support program that analyzes images of a human body and displays analysis results, the program causing a computer to execute a process comprising processing of acquiring a plurality of frame images from a database that stores the images; processing of specifying at least one frequency of a blood vessel beat element extracted from a blood vessel beat of a subject; processing of dividing an analysis range that is set for each of the frame images into a plurality of block areas and calculating a change in image in a block area in each of the frame images; processing of Fourier-transforming a change in image in each block area in each of the frame images; processing of extracting a spectrum in a fixed band including a spectrum corresponding to the at least one frequency of the blood vessel beat element, out of a spectrum obtained after the Fourier-transforming; processing of performing inverse Fourier transform on the spectrum extracted from the fixed band; and processing of displaying each of the images after performing the inverse Fourier transform, on a display.

(9) Further, a diagnostic support program according to one aspect of the present invention has a feature of causing the computer to execute the process further comprising processing of extracting a spectrum in a fixed band that includes a frequency of noise and includes a spectrum corresponding to a frequency other than the frequency of the blood vessel beat element obtained from each of the frame images, or an input frequency or a frequency band, out of the spectrum obtained after the Fourier-transforming, by using a filter.

(10) Further, a diagnostic support program according to one aspect of the present invention has a feature of causing the computer to execute the process further comprising processing of generating the image between the frames based on the frequency of the specified cardiovascular beat element and each of the frame images.

(11) Further, a diagnostic support program according to one aspect of the present invention is a diagnostic support program that analyzes images of a human body and displays analysis results, the program causing a computer to execute a process comprising processing of acquiring a plurality of frame images from a database that stores the images; processing of specifying at least one frequency of a respiratory element including all or part of expired air or inspired air based on pixels in a specific area in each of the frame images; processing of detecting a lung field and a diaphragm based on the at least one frequency of the specified respiratory element; processing of dividing the detected lung field into a plurality of block areas and calculating a pixel change rate in a block area in each of the frame images; processing of extracting only the block area for which a tunable rate is within a predetermined fixed range, using the tunable rate that is a value of a ratio of the pixel change rate in the block area to a change rate of a dynamic region linked with respiration; and processing of displaying each of the images including only the extracted block area, on a display.

(12) Further, a diagnostic support program according to one aspect of the present invention has a feature of causing the computer to execute the process further comprising processing of specifying at least one frequency of a cardiovascular beat element extracted from a heartbeat or a blood vessel beat of a subject, or at least one frequency of a blood vessel beat element extracted from the blood vessel beat.

(13) Further, a diagnostic support program according to one aspect of the present invention has a feature that logarithmic values of the tunable rate are determined as a fixed range including 0.

(14) Further, a diagnostic support program according to one aspect of the present invention has a feature of causing the computer to execute the process further comprising processing of detecting the lung field in another frame, using at least one Bezier curve on the lung field detected in a specific frame.

(15) Further, a diagnostic support program according to one aspect of the present invention has a feature that internal control points are selected inside the detected lung field, and the lung field is divided by curves or straight lines passing through the internal control points inside the lung field.

(16) Further, a diagnostic support program according to one aspect of the present invention has a feature that an interval between control points at an outer extension of the detected lung field and near the outer extension is made to be relatively large, and an interval between the internal control points is made to be relatively small according to an expansion rate for each region inside the detected lung field.

(17) Further, a diagnostic support program according to one aspect of the present invention has a feature that an interval between control points is made to be relatively larger toward a craniocaudal direction with respect to the human body, or to be relatively larger toward a specific vector direction, in the detected lung field.

(18) Further, a diagnostic support program according to one aspect of the present invention has a feature of causing the computer to execute the process further comprising processing of detecting the lung field in another frame, using at least one Bezier surface on the lung field detected in a specific frame.

(19) Further, a diagnostic support program according to one aspect of the present invention has a feature of causing the computer to execute the process further comprising processing of detecting a range corresponding to the analysis range in another frame, using at least one Bezier curve, on a predetermined analysis range in a specific frame.

(20) Further, a diagnostic support program according to one aspect of the present invention has a feature of causing the computer to execute the process further comprising processing of drawing at least one of the lung field, blood vessels and a heart, using at least one Bezier curve.

(21) Further, a diagnostic support program according to one aspect of the present invention is a diagnostic support program that analyzes images of a human body and displays analysis results, the program causing a computer to execute a process comprising processing of acquiring a plurality of frame images from a database that stores the images; processing of specifying an analysis range using Bezier curves, for all the acquired frame images; and processing of detecting an analysis target, based on a change in intensity within the analysis range.

(22) Further, a diagnostic support program according to one aspect of the present invention has a feature of causing the computer to execute the process further comprising processing of calculating a feature on the periphery of the detected analysis target.

(23) Further, a diagnostic support program according to one aspect of the present invention has a feature that the diaphragm is detected by calculating a difference in intensity for each of continuous images to display an index indicating a position or a shape of the dynamic region linked with the detected diaphragm or respiration.

(24) Further, a diagnostic support program according to one aspect of the present invention has a feature that a diaphragm that is not interrupted by regions other than the diaphragm is displayed by changing a threshold of the intensity to interpolate a whole shape of the diaphragm.

(25) Further, a diagnostic support program according to one aspect of the present invention has a feature of causing the computer to execute the process further comprising processing of calculating the at least one frequency of the respiratory element from the position or the shape of the detected diaphragm, or the position or the shape of the dynamic region linked with the respiration.

(26) Further, a diagnostic support program according to one aspect of the present invention has a feature of causing the computer to execute the process further comprising processing of spatially normalizing the detected lung field, or time-normalizing the lung field using reconstruction.

(27) Further, a diagnostic support program according to one aspect of the present invention has a feature that the respiratory element is corrected by changing a phase of the at least one frequency of the respiratory element, or smoothing a waveform of the respiratory element.

(28) Further, a diagnostic support program according to one aspect of the present invention has a feature that a waveform of any of regions within the analysis range is specified, and constituent elements of a frequency of the specified waveform are extracted to output an image corresponding to the constituent elements of the frequency of the waveform.

(29) Further, a diagnostic support program according to one aspect of the present invention has a feature that density in the analysis range is detected, and a place where the density changes in a relatively large manner is removed therefrom.

(30) Further, a diagnostic support program according to one aspect of the present invention has a feature of causing the computer to execute the process further comprising processing of selecting the at least one frequency when performing the inverse Fourier transform, based on a spectrum composition ratio in organ-specific cyclic change, from the spectrum obtained after the Fourier-transforming.

(31) Further, a diagnostic support program according to one aspect of the present invention has a feature that an X-ray photographing device is controlled so as to adjust an irradiation interval of X-rays according to the at least one frequency of the respiratory element.

(32) Further, a diagnostic support program according to one aspect of the present invention has a feature that only a block in which an amplitude value is relatively large is extracted and displayed, after performing the inverse Fourier transform.

(33) Further, a diagnostic support program according to one aspect of the present invention has a feature of causing the computer to execute the process further comprising processing of calculating a change amount of the diaphragm or a thorax to calculate a change rate from the change amount by specifying the diaphragm or the thorax after identifying the lung field.

(34) Further, a diagnostic support program according to one aspect of the present invention has a feature of causing the computer to execute the process further comprising processing of multiplying a specific spectrum by a coefficient, wherein emphatically displaying is performed based on the specific spectrum multiplied by the coefficient.

(35) Further, a diagnostic support program according to one aspect of the present invention has a feature that a digital filter is applied to a region as being the analysis target in order to specify the frequency or the waveform of the respiratory element, after acquiring the plurality of frame images from the database that stores the images.

(36) Further, a diagnostic support program according to one aspect of the present invention has a feature that a plurality of frequencies of the respiratory element including all or part of the expired air or the inspired air are specified based on the pixels in the specific area in each of the frame images to display each of the images corresponding to the plurality of respective frequencies of the respiratory element, on the display.

(37) Further, a diagnostic support program according to one aspect of the present invention has a feature that with respect to a specific range for at least certain one frame image, an image of being aggregated to a certain fixed value is selected, and displayed on the display.

Effect of the Invention

According to one aspect of the present invention, it becomes possible to display movement of an area where the shape changes for every respiratory element including all or part of expired air or inspired air.

DETAILED DESCRIPTION OF EMBODIMENTS

First, the basic concept of the present invention will be explained. According to the present invention, as to the biological movement of respiration and blood vessels, area and volume of a lung field, or others in a human body, with respect to the movement captured in a repetitive manner in a fixed cycle, a fixed repetition or fixed movement (routine) on a time axis in the entire or partial range is captured as a wave and measured. For measurement results of the wave, (A) a form of the wave itself or (B) wave intervals (frequency: Hz) are used. These two concepts are referred to collectively as "base data".

Waves that are linked similarly during the same period of time may exist. For example, in the case of respiration, the following approximation can be conceptualized.

(average of change in "density" in a rough range)≈(change in thorax)≈(movement of diaphragm)≈(lung function inspection)≈(thoracoabdominal respiration sensor)

With regard to the above-described "(A) a form of the wave itself", the concept of "waveform tunability" is used to display images based on the foregoing (Wave form tunable imaging). Further, with regard to the above-described "(B) wave intervals (frequency: Hz)", the concept of "frequency tunability" is used to display images based on the foregoing (Frequency tunable imaging).

Figure 13:
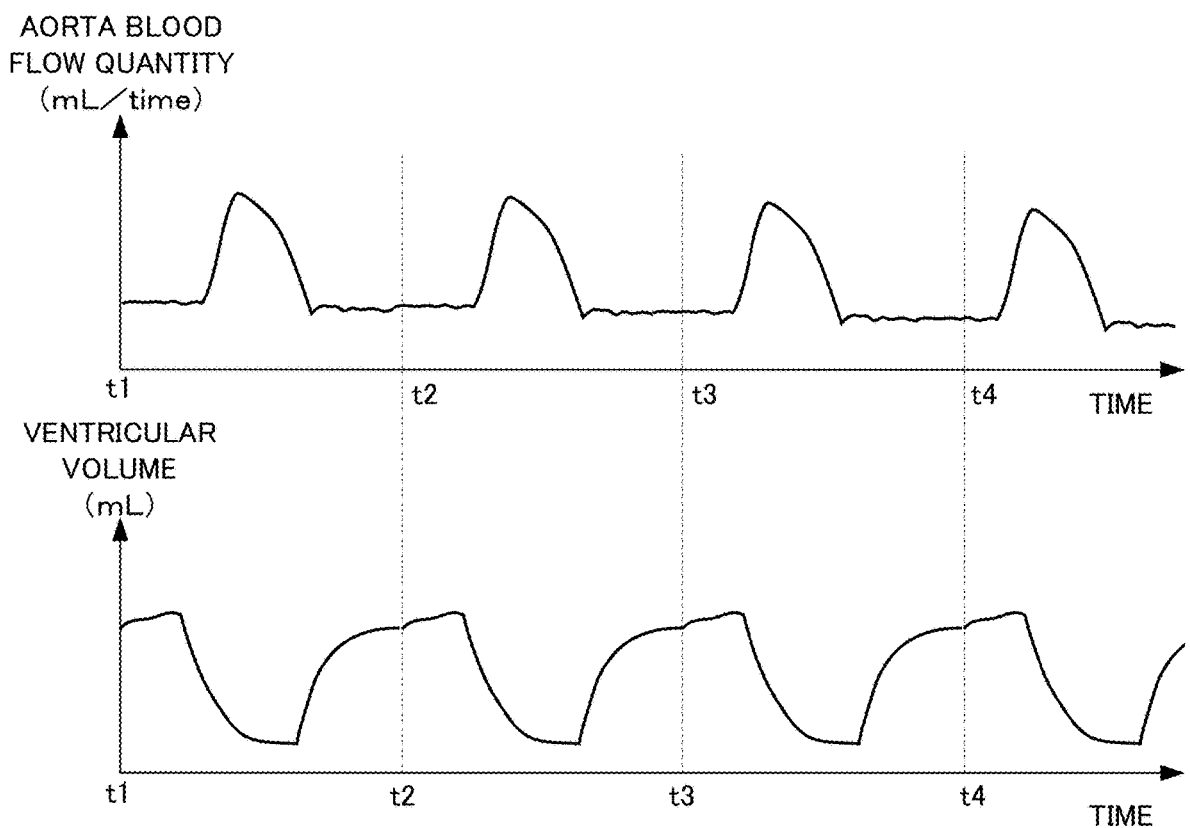
FIG. 13 is a diagram showing an example of contrasting between a waveform of aorta blood flow quantity and a waveform of ventricular volume.

For example, in the case of a heart, as in "an example of contrasting between a waveform of aorta blood flow quantity and a waveform of ventricular volume" shown in FIG. 13, a peak of the aorta blood flow quantity and a peak of the ventricular volume, as well as the waveforms are inconsistent with each other. However, when setting a time width at equal intervals as one cycle, as with time t1 to t2, time t2 to t3, time t3 to t4 . . . in FIG. 13; one cycle of the aorta blood flow quantity and one cycle of the ventricular volume are repeated many times, and thus with respect to each waveform, it can be said that the frequency is tunable. When paying attention to this wave form, one cycle is specified from the actual measurement value as shown in FIG. 13, and the waveform (Wave form) can be predicted by using a model waveform. That is, as to how to produce "a waveform as base data", it may be actually measured and produced from a frequency (cycle), and a model waveform may be used thereto. It a cycle (period) of an organ having a frequency of a heart or the like is found, the waveform (Wave form) can be predicted, and thus it becomes possible to display a moving image of the organ based on this waveform by grasping the waveform of the aorta blood flow quantity, the ventricular volume or the like.

In addition, when acquiring a change in "density" of respiration, a heart, pulmonary hilum or the like, a digital filter may be applied thereto in advance in such a manner that another element is not mixed.

Further, according to the present invention, a concept of "respiratory element" is used. The "respiratory element" includes all or part of expired air or inspired air. For example, "one respiration" can be considered to be separately divided into "one expired air" and "one inspired air", and can also be considered to be limited to any of "0%, 10%, 20%, 30%, 40%, 50%, 60%, 70%, 80%, 90%, and 100%" of "one expired air or one inspired air". Further, evaluations can also be made by extracting only a fixed ratio of each expired air, for example, only 10% of the expired air. It is made to be possible to extract an image with higher accuracy, by using any of these data or data obtained by using those in combination. In this case, calculations may be sometimes interactively carried out many times.

Such an idea can be similarly applied to not only "respiratory element" but also "cardiovascular element".

Herein, when producing the base data, mutual component extractions are made up for each other by feature amounts obtained from a single or a plurality of modalities (for example, two or more of "density" in a certain fixed range, a change amount constituted by "volumetry", movement of a thorax, movement of a diaphragm, "spirometry", and a thoracoabdominal respiration sensor), or by plural times of waveform measurement for the same respiratory cycle and so forth, thereby improving accuracy. By doing this, it becomes possible to reduce the artifact and to improve the accuracy based on a certain fixed prediction of a line or the like. Here, "density" is translated as "mitsudo", but in an image, it means "absorption value" of pixels in a specific area. For example, in the case of CT, air, a bone and water are used as "−1000", "1000", and "0", respectively.

Further, fluctuations in axis, width, range, and Hz due to the mutual component extractions and the width are estimated. That is, by plural times of superimposition, the axis setting of Hz is averaged and the optimum range of each of the axis, width, range, and Hz is calculated via variance. At this time, there is a case where Hz (noise) of another behavior is extracted and if a wave thereof exists, the degree in which no wave is included is relatively measured. That is, there is a case where only a part of the waveform out of the entire waveform element is extracted.

In the present specification, "density" and "intensity" are distinctively used. As described above, "density" means an absorption value and exhibits high air permeability in original images of XP and an XP moving image, and air, water and a bone are to be displayed as "−1000", "0" and "1000", respectively, by digitizing a portion exhibiting the high permeability as being white. On the other hand, "intensity" is one relatively changed from "density", for example, one displayed via "conversion" into a degree of signal and density width by being normalized. That is, "intensity" is a relative value of light-dark, an emphasis degree, and so forth. It is represented as "density" or "change in density (A density)" during directly dealing with the absorption value of an XP image. Then, this is converted thereinto as described above, for image expression reasons, and represented as "intensity". For example, "intensity" is given in a case where color displaying to 256-step gray scales of from 0 to 255 is carried out. Such a terminology distinction is applicable to the case of XP or CT.

On the other hand, in the case of MRI, even though air, water and a bone are attempted to be set as "−1000", "0" and "1000", respectively, there is a situation in which the values are largely changed due to pixel values of MRI, types of measuring machines, person's physical conditions, physique, and measuring time; and how to acquire signals of MRI such as T1 emphasis images and so forth also varies by a facility thereof and the types of measuring machines, thereby being unable to be fixed. Accordingly, in the case of MRI, no definition of "density" can be applied thereto as with the case of XP and CT. Therefore, MRI deals with relative values from a stage of initial extraction, thereby expressing as "intensity" from the beginning. Then, the signals for processing are also "intensity".

From those described above, it becomes possible to obtain the base data. For the above-described base data, a new target desired to be measured is extracted in a certain fixed width and range of a waveform and Hz of a wave of the above-described base data. For example, the extraction is performed in the width, range and a waveform element for only respiration extraction and a degree of blood vessel extraction. In addition, this waveform and the width of Hz are relatively and collectively determined based on statistics by using the waveform element in another function, "artifact" such as noise and so forth, the waveform of another "modality" deemed to have another tunability, reproducibility performed plural times, and so forth. Then, adjustment and experience are required therein (it is also possible to apply machine learning thereto). This is because while the width and range are extended, the element of another function begins to enter, if they are too narrow, the element of the function itself is eliminated, and thus the range needs to be adjusted. For example, in the case of presence of data of plural times, it is easy to specify the range, Hz, the concordance width in measurement, and so forth.

[With Regard to a Tunable Concordance Rate]

In the present specification, a tendency of image change will be explained as a tunable concordance rate. For example, a lung field is detected and divided into a plurality of block areas to calculate "average density (pixel value x)" of the block areas in each frame image. Then, a ratio (x') of an average pixel value of the block areas in each frame image to a change width (0% to 100%) from the minimum value of "average density (pixel value x)" to the maximum value is calculated. On the other hand, by using a ratio value (x'/y') of a ratio (y') of change (y) in diaphragm of each frame image to a change width (0% to 100%) from at the minimum position of the diaphragm to at the maximum position, only block areas for which the ratio value (x'/y') is within a predetermined fixed range are extracted.

Herein, the case where y'=x' or y=ax (a represents a numerical value of an amplitude of a diaphragm, or a coefficient of a numerical value of "density") means complete concordance. However, it does not mean that only the case of the complete concordance indicates a meaningful value, a value having a certain fixed width should be extracted. Thus, according to one aspect of the present embodiment, a fixed width is determined using logarithms (log), as described below. That is, when calculated at a ratio (%) in the case where y=x, complete concordance of tunability is "log Y'/x'=0". Further, when extracting one in which a range of a tunable concordance rate is narrow or a (numerically narrow) range, for example, it is determined as "log Y'/x'=−0.05~+0.05" in the range that is close to 0, and when being one in which a range of a tunable concordance rate is wide or a (numerically wide) range, for example, it is determined as "log Y'/x'=−0.5~+0.5" in the range that is close to 0. That is, logarithmic values of the tunable rate are determined as a fixed range including 0. As this range is narrower, and the numerical value that is concordant within the range is also higher, the tunable rate can be said to be higher.

When counting the number by determining this ratio value for each pixel of the pixels, a normal distribution in which the case of complete concordance is taken as a peak is obtained in the case of healthy persons. In contrast, in the case of those having disease, a distribution of this ratio value is to be lost. In addition, as described above, the method of determining a width using logarithms is only one example, and the present invention is not limited thereto. That is, the present invention is one performing "image extraction" as the following: (average of change in "density" in a rough range)≈(change in thorax)≈(movement of diaphragm)≈(lung function inspection≈(movement of thoracoabdominal respiration sensor)≈(area and volume of lung field), and is also applicable to methods other than the method of using logarithms. It becomes possible to display a tunable image via such a method.

In the case of blood vessels, as to a series of changes of "density" (x (one waveform at a pulmonary hilum portion) produced by responding to a series of contractions of a heart (y), a slight time delay (change in phase) is, as is, present, thereby being displayed as y=a' (x−t) (that is, Y≈X). In the case of complete concordance, since t=0, y=x or y=a'x. Similarly to the case of the diaphragm, when extracting one in which a range of a tunable concordance rate is narrow or a (numerically narrow) range, for example, it is determined as "log Y'/x'=−0.05~+0.05" in the range that is close to 0, and when being one in which a range of a tunable concordance rate is wide or a (numerically wide) range, for example, it is determined as "log Y'/x'=−0.5~+0.5" in the range that is close to 0. As this range is narrower, and the numerical value that is concordant within the range is also higher, the tunable rate can be said to be higher.

In the case of other blood vessels, the above-described "portion responding to a heart" is excluded, and "density" on the center side that is plotted from pulmonary hilum is used. The case of peripheral blood vessels may be also similarly taken care of.

Further, the present invention may also be applied to a circulatory system. For example, change in "density" of a heart is directly associated with change in "density" of a blood flow to a pulmonary hilum portion—a peripheral lung field, and change in a series of changes in "density" of the heart and change in "density" of the pulmonary hilum portion are subjected to a type of conversion, and transmitted, as is, thereto. It appears that this is produced by obtaining a slight phase difference from the relationship between the change in "density" of the heart and the change in "density" of the pulmonary hilum portion. Further, change in "density" of the pulmonary hilum portion or the like is associated, as is, with change in "density" of a lung field to a blood flow, and thus it is possible to express tunability by one (concordance rate relationship in Y≈X) reflected with an as-is rate. Further, it appears that as to a cervical blood vessel system and a large blood vessel system such as chest, abdomen, pelvis, four limbs or the like, a change in "density" plotted at central heart blood vessels on the periphery thereof is directly associated therewith, or also associated therewith accompanying a slight phase in a similar manner. Then, when the "density" is changed in accordance with the background, and propagated, it becomes possible to be considered as a tunable concordance rate so as to propagate the situation of change in "density".

Herein, a change amount in one image and a change rate in one image each may be set as "total amount of inspired air≈total amount of expired air". Then, in the case where a numerical value is relatively found from the difference from transparency of surrounding air, for being displayed as a relative value (Standard Differential Signal Density/Intensity) when a change amount from "density" of a lung field is set to 1, the change amount and the change rate can be extracted for each of (1) as to a different image for each image, an image when 1 is set to each one (general assumption), (2) as to a different image for each one, a ratio when an absolute value of the whole inspired air or the whole expired air obtained by adding "density (change amount and change rate)" thereto, or of inspired air and expired air is set to 1, and (3) as to carrying out photographing plural times, the ratio obtained as a total amount of "density" while taking each respiration (selected several times at the time of 10%) that is set to 1.

Further, in the case of 3D of MR or the like, as to a value (when it is set to 1 at this time) obtained by summing "intensity (in the case of MR)" or "density" (in the case of CT) of the whole inspired air, the difference of its "intensity" or "density" can be converted into "peak flow volume data" of inspired air (during rest, or even in effort respiration), and as to this value, an actual measurement amount of respiration and a respiration rate at a portion of each lung field can be converted thereinto by finding a ratio of "intensity" or "density" when calculating "3D×time" with at least MRI, CT or the like. Similarly, it becomes possible that a distribution in "capillary phase" of "flow" in a lung field presents an estimation value of being converted into a distribution of a lung blood flow peripheral amount, or a volume by inputting one time cardiac output.

That is, satisfied is the following: (an inspired air change amount per image)×(the whole number of those of inspired air)≈(an expired air change amount per image)×(the whole number of those of expired air)≈(inspired air respiration at this time: volume of natural respiration or effort respiration)≈(expired air respiration at this time volume of natural respiration or effort respiration)≈(a change amount of inspired air or expired air of "volume" of natural respiration or effort respiration at this time). When taking out only a change amount of one with 10% or 20%, an estimation value is possible to be calculated by calculating (the whole number of those)×(a change amount in that time)

The extracted amount of change is visualized and extracted onto an image. This is a respiratory function analysis and a blood vessel analysis as explained below. Then, a change rate of each of the thorax and the diaphragm is visualized. At this time, there are some cases where the artifact with respect to the results is eliminated again and extracting the function is carried out via extraction from the extracted waveform of new data, the data waveform that becomes the first base, another waveform of modality or the like, the waveform of the ambience, and the waveform of plural times. The method of eliminating the artifact will be described later.

Further, there is a case where the feature amount is grasped even from those from which change components extracted from other than those extracted as described above are excluded. For example, when grasping movement of the abdominal intestinal tract, an attempt is made to extract the movement of the abdominal intestinal tract by excluding the influence of respiration and the influence of blood vessels from the abdomen.

Figure 1A:
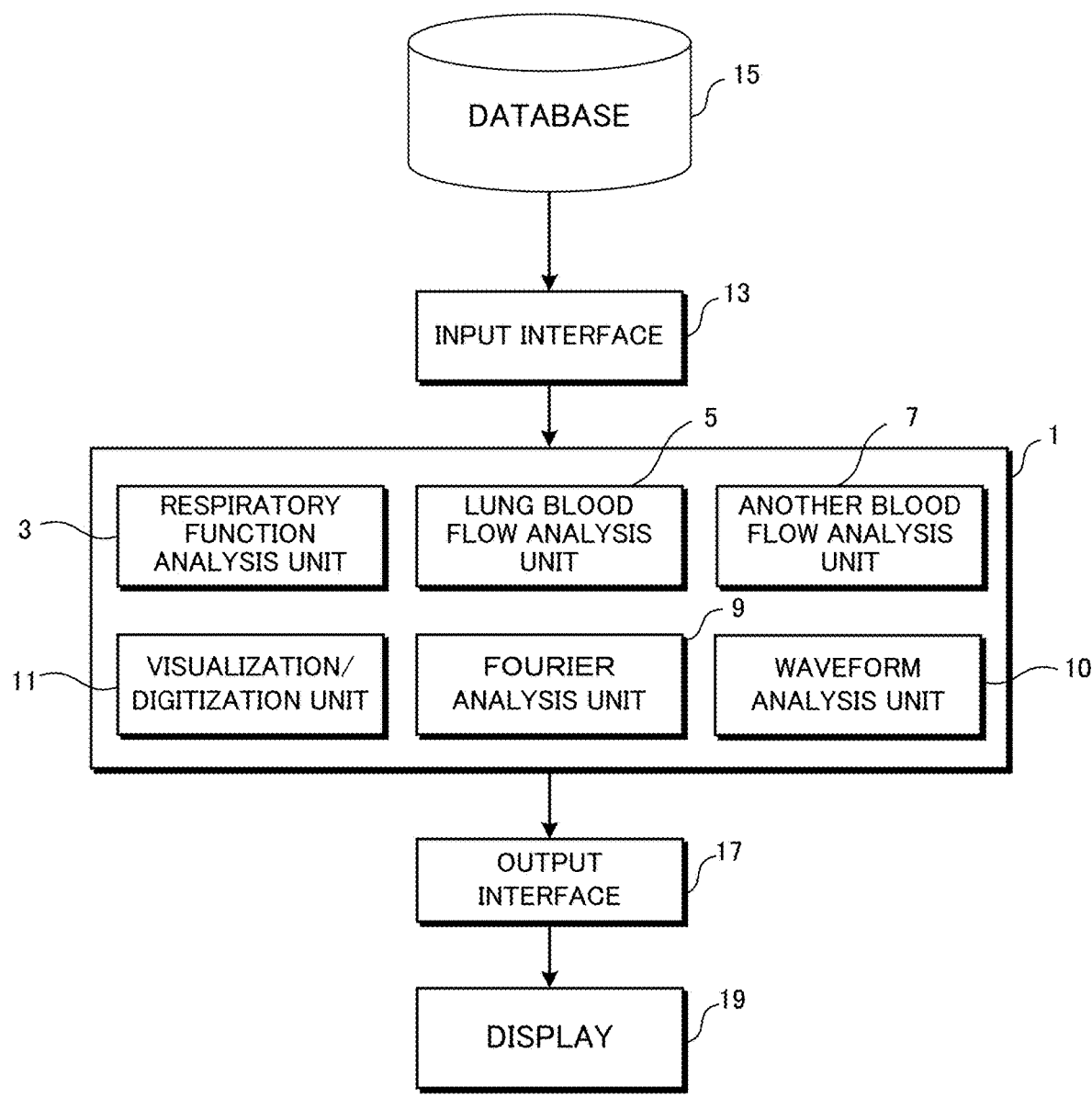
FIG. 1A is a diagram showing an outline configuration of a diagnosis support system according to the present embodiment.

Hereinafter, an embodiment of the present invention will be explained referring to the drawings. FIG. 1A is a diagram showing an outline configuration of a diagnosis support system according to the present embodiment. This diagnosis support system performs a specific function by causing a computer to execute a diagnostic support program. A basic module 1 includes a respiratory function analysis unit 3, a lung blood flow analysis unit 5, another blood flow analysis unit 7, a Fourier analysis unit 9, a waveform analysis unit 10, and a visualization/digitization unit 11. The basic module 1 acquires image data from a database 15 via an input interface 13. The database 15 stores, for example, images via DICOM (Digital Imaging and COmmunication in Medicine). An image signal output from the basic module 1 is displayed on a display 19 via an output interface 17. Next, the function of the basic module according to the present embodiment will be explained.

[Cycle Analysis of Respiratory Element]

According to the present embodiment, the cycle of a respiratory element is analyzed based on the following indexes. The respiratory element means a concept including all or part of expired air or inspired air, as described above. That is, at least one frequency of the respiratory element is analyzed by using at least one of "density"/"intensity" in a fixed area inside a lung field, movement of a diaphragm, and movement of a thorax. According to the "at least one frequency of the respiratory element", one or more frequency spectra are indicated by the respiratory element, exhibiting a concept including the case of having a fixed band width. A lung field is assumed as an aggregate of blocks and a plurality of frequencies are extracted from each block, and thus in the present embodiment, these are processed as a frequency group. In addition, as previously described, the base data has both concepts of "a form of the wave itself" and "wave intervals (frequency: Hz)", and thus it is also possible to perform processing as a form of the wave itself. Further, also used may be a range constituted by certain fixed volume "density"/"intensity" measured in a region exhibiting high permeability of X-ray (besides that, a plurality of kinds of modality such as others including CT and MRI), data obtained by another measurement method such as spirogram or the like, and external input information.

In addition, the analysis results for each respiration are compared to analyze the tendency from a plurality of pieces of data, and accuracy of the data can also be improved.

Further, it is also possible that the respiratory element is corrected by changing a phase of at least one frequency of the respiratory element, or smoothing a waveform of the respiratory element. In this case, the phase is matched with the wave by using the movement such as (thorax, movement of diaphragm besides that)≈(movement of thorax)≈(density) ≈(fine lung function)≈(thorax sensor). Further, a lung field average "density" is tracked and the last change is approximated as a form of a wave by a squares method for the wave to identify the "density" of a chest or the like, there are some cases where a change in "density" of the lung is evaluated by evaluating "density" of the whole screen since the largest changing value is "density" of the lung. When plotting the wave, there are an actually moving case and a case where phase shift is generated by the measured value. At this time, there is a case where the phase correction is made for the phase difference by positions of the maximum and minimum values, a form of the wave as a whole, or the like.

[Waveform Analysis]

The constituent elements of a frequency of a waveform can be calculated from the waveform of the respiratory element. By this, "waveform tunable image" is acquired as described above. Specifically, a waveform in any of regions within the analysis range is specified and the constituent elements of a frequency of the specified waveform are extracted to output an image corresponding to the constituent elements of the frequency of the waveform.

[Cardiovascular Beat Analysis and Blood Vessel Beat Analysis]

According to the present embodiment, the cardiovascular beat analysis is carried out and the blood vessel beat is analyzed based on the following indexes. That is, the blood vessel beat is analyzed using a change in "density"/"intensity" of each region by specifying the heart/position of pulmonary hilum/main blood vessel from the measurement results of other modalities such as an electrocardiogram and a pulsimeter, or from the lung contour. Further, a change in "density"/"intensity" of a target region may be analyzed by manually performing plotting on an image. Then, at least one frequency (waveform) of the cardiovascular beat element obtained from a heartbeat or a blood vessel beat is specified. In addition, it is desirable to improve accuracy of data by comparing the analysis results for each beat and analyzing the tendency from a plurality of pieces of data. Further, it becomes possible to improve accuracy by performing the extraction of "density"/"intensity" of each region plural times, as well as by performing the foregoing with respect to a fixed range. Further, there is also a method of inputting a cardiovascular beat frequency or a frequency band.

[Lung Field Identification]

An image is extracted from the database (DICOM), and a lung contour is automatically detected by using results of the cycle analysis of the respiratory element as described above. A technique that has been known conventionally is usable for automatically detecting the lung contour. For example, it is possible to use the technique that has been disclosed in Unexamined Japanese Patent Application Laid-Open Publication No. Sho 63-240832 or Unexamined Japanese Patent Application Laid-Open Publication No. Hei 02-250180. Next, the lung field is divided into a plurality of block areas to calculate a change in each block area. Herein, size of the block area may be determined according to a photographing speed. When the photographing speed is slow, the corresponding region is difficult to be specified on a frame image behind a certain frame image, and thus the block area is made to be large. On the other hand, when the photographing speed is fast, the number of frame images per unit time is large, and thus, it is made to become possible to follow even when the block area is small. Further, the size of the block area may be calculated according to which timing out of a cycle of the respiratory element is selected. Herein, it is often necessary to correct a deviation of the lung field area. In this case, the movement of the thorax, the movement of the diaphragm, and the position relationship of blood vessels in the entire lung field are identified, and the relative position of the lung contour is further grasped to relatively make evaluations based on the movement. In addition, when the block area is too small, a flicker often occurs in the image. In order to suppress this, the block area needs to have a fixed size.

The lung field can be represented as coordinates of points and control points by using at least one Bezier curve in the automatically detected lung field area. Then, the lung field is possible to be represented by using closed curves enclosed using at least one Bezier curve, that is, a plurality of "simple closed curves". Similarly, an analysis target is also possible to be represented by using one or plural simple closed curves.

The lung field in each frame enables detecting the lung field in another frame, using at least one Bezier curve on the lung field detected in a specific frame. For example, there is provided a method of detecting respective two lung fields that are maximum and minimum to calculate the lung field in another frame, using the two lung fields. Herein, a variable called "change rate" is defined to another frame. The "change rate" is a value that expresses size of the lung field, that is, a state of respiration; and can be calculated from a position of the diaphragm, an "intensity" average value of the whole image, and so forth. It is also possible to calculate measured data of an external device such as spirography or the like, and to utilize a modeled change rate. In this way, the variable called "change rate" can be arbitrarily set, and thus, for example, it can also be calculated assuming that the lung field is changed at a fixed ratio (10%, 20%, 30% . . . ). The change rate defined in this manner includes errors, and thus there is a case where the subsequent processing is carried out by using the result obtained by performing error automatic/manual elimination, the result obtained by performing the approximation making use of a least squares method, or the like. Assuming that linear deformation is caused up to the maximum lung field and the minimum lung field, the lung field in each frame is calculated by using a change rate of each frame, making use of a method of linear conversion or the like.

Further, the above-described processing is possible to be applied in the arbitrary range for continuous frames. For example, according to the respiration, the lung field repeats changes to a maximum and a minimum, but the maximum shape is not always constant in the actual measurement. For example, by applying the above-described processing in each range of a maximum to a minimum, and a minimum to a maximum, it is expected to calculate the lung field with high accuracy rather than carrying out calculation by defining and calculating the two lung fields that are maximum and minimum. In addition, herein, the explanation has been made as a specific example using maximum and minimum, but the present invention is not limited thereto, and because of "arbitrary range", it is possible to be carried out, for example, at the position of 0% and 30%, or 30% and 100% in the middle of the respiration.

Further, though the accuracy is reduced, it is also possible to calculate the lung field in each frame from one lung field. For example, a change vector of the lung field is specified by estimating from shape of the thorax. Specifically, a method of specifying a change vector to each control point of a Bezier curve, but the present invention is not limited thereto. Then, the lung field in each frame is calculated by using the detected one lung field and a change vector, and a change rate in each frame. With respect to the calculation result, the accuracy can be further improved by automatically or manually making the correction. Further, in the case of 3D as well, the above-described method is effective. That is, even in the case of 3D, it is also possible to execute processing of detecting a lung field in another frame, using at least one Bezier surface on the lung field detected in a specific frame. In this way, it becomes possible to acquire an image of the lung field between frames.

Figure 6A:
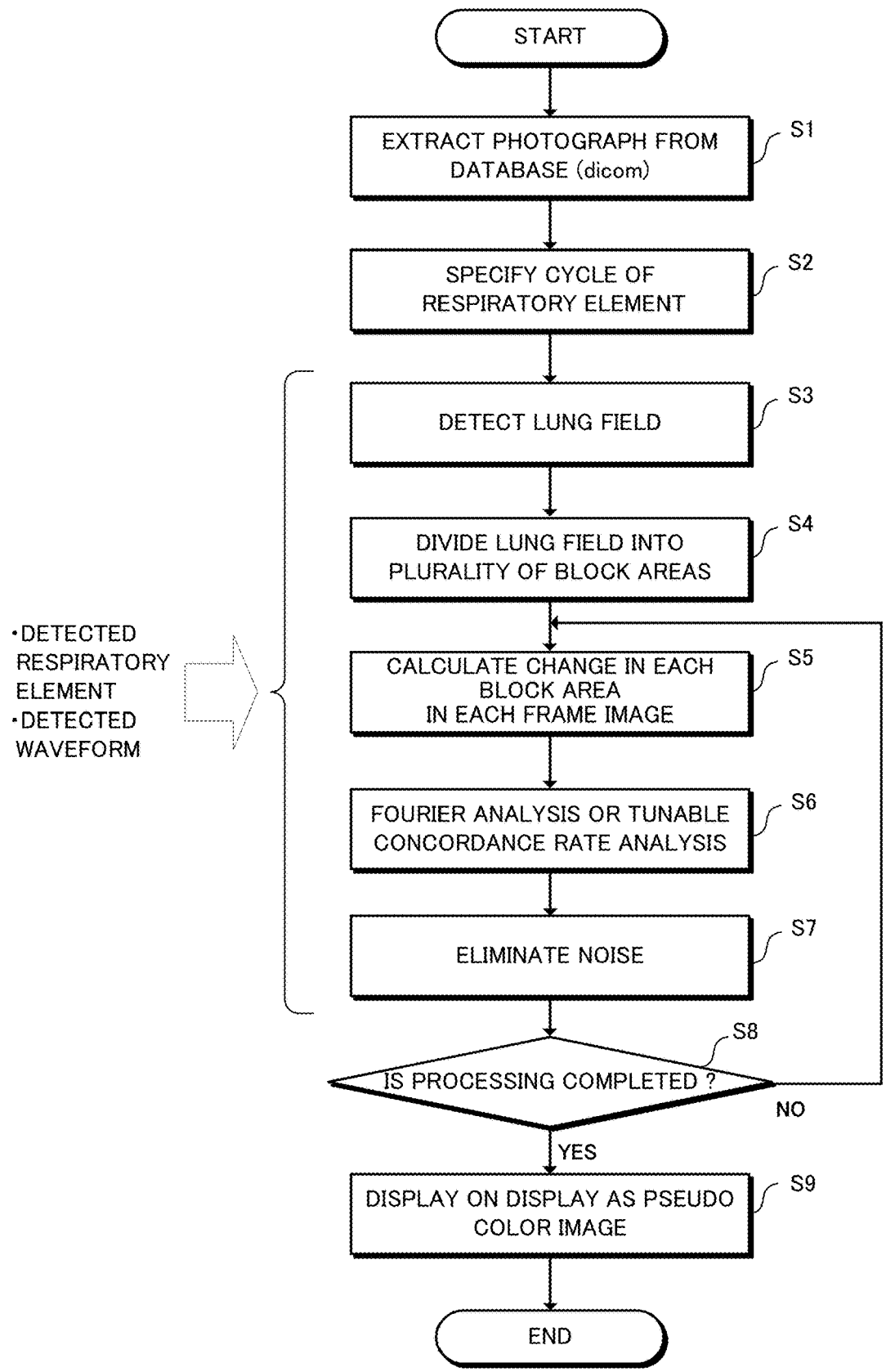
FIG. 6A is a flowchart showing an outline of a respiratory function analysis according to the present embodiment.
Figure 6B:
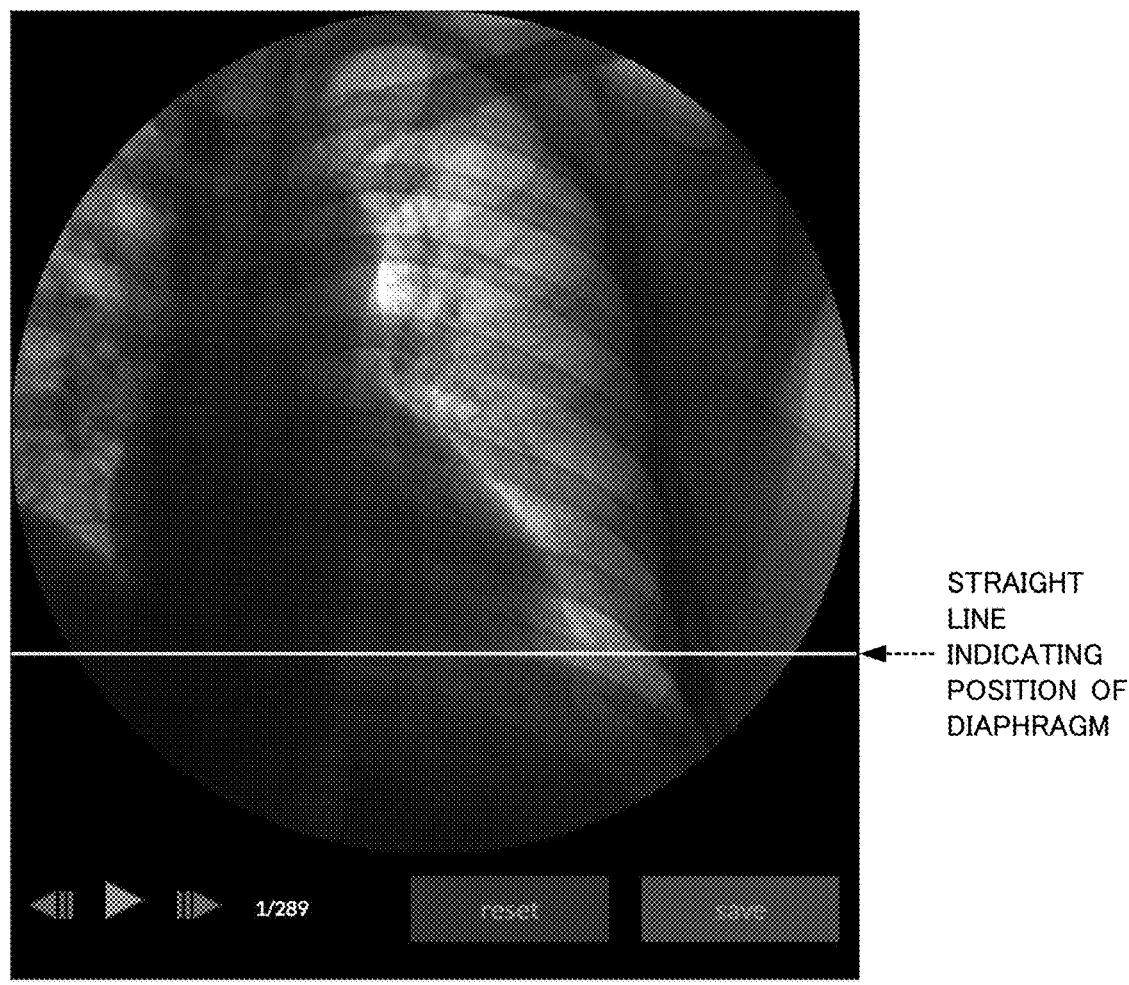
FIG. 6B is a diagram showing an example of an image displayed on a display.
Figure 6C:
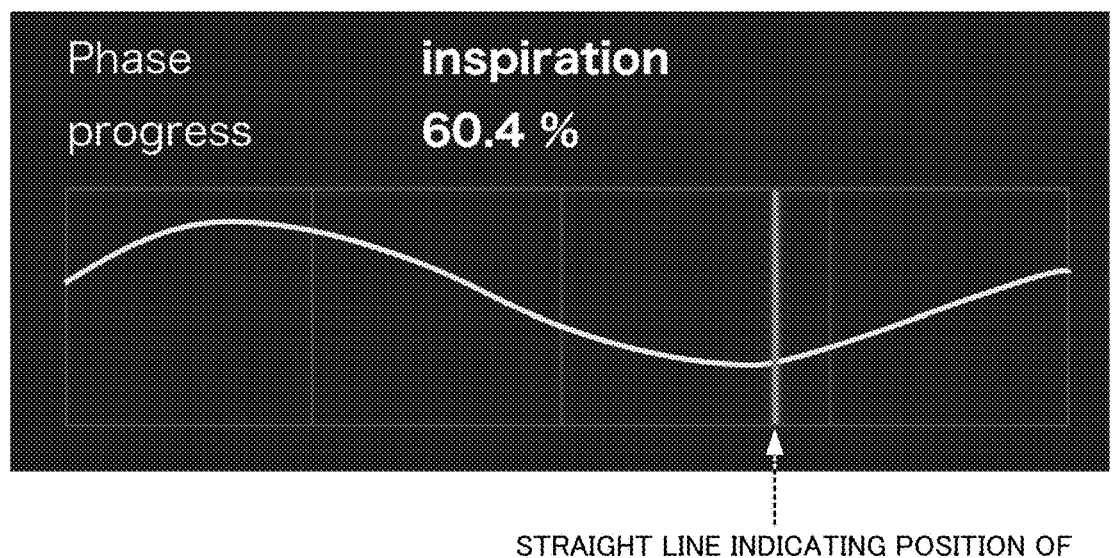
FIG. 6C is a diagram showing an example of an image displayed on a display.

FIG. 6C is a graph showing a cycle of a respiratory element. A white vertical line is shown in the image of FIG. 6C, but this is a straight line (index) indicating the position at the present point in time in a cycle of the respiratory element, and moves so as to indicate the position at the present point in time in the cycle of the respiratory element, according to the movement of a moving image of a lung shown in FIG. 6B. It becomes possible to clearly grasp the present position in a cycle of the movement of the lung by indicating the present position of the cycle of the respiratory element. In addition, according to the present invention, it is possible not only to show a cycle of a respiratory element with a graph but also to graph all of those such as "density" of a blood flow, a thorax, and a diaphragm that are linked with the movement of the lung.

In the "case of stopping breathing" of a subject, there is a case where no frequency of a respiratory element can be specified. In this case, the after-mentioned Fourier analysis is performed by using at least one frequency of a cardiovascular beat element extracted from a heartbeat or a blood vessel beat of the subject. In this case, a dividing way of the after-mentioned block area may be changed according to a way of movement of a dynamic region linked with a heart, a diaphragm, respiration or the like.

[Detection of Periphery, and Evaluation Thereof]

Figure 14:
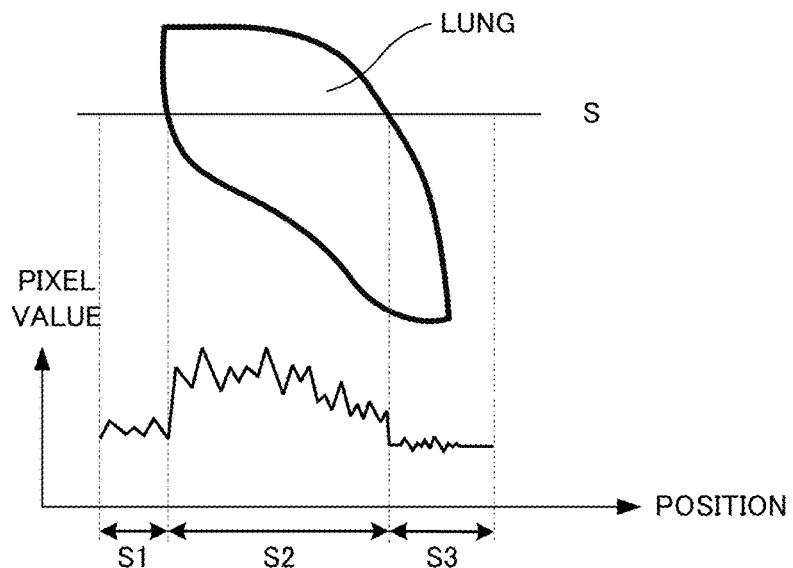
FIG. 14 is a diagram showing an example of pixel values of a lung and near the lung.

According to the present invention, It is possible that a periphery of a lung is detected to evaluate the periphery. For example, after calculation a lung field by the foregoing method, the position and shape of the periphery can be detected again with high accuracy. The point is plotted at an arbitrary position inside the calculated lung field, and a line is extended in all directions to evaluate a change in pixel value for each line. For example, as shown in FIG. 14, when calculating the pixel value along a line segment S by which the lung is cut, it is understood that the pixel is largely varied on the periphery thereof, but the absolute value of the variation differs therefrom. For example, the accuracy of periphery detection is improved by adjusting the threshold value at the time when detecting the periphery on the left side as well as the periphery on the right side. Further, a characteristic of variation of the pixel value for each area is also usable. As shown in FIG. 14, even though the difference at the edge of area S2 and area S3 is small, the edge of the area S2 and the area S3 can be specified from variance of the variation of the pixel value. Attention has been paid to the variance in this case, but the present invention is not limited thereto.

Further, in the same light, it becomes possible to detect the periphery of the analysis range of each of an organ, blood vessels, a tumor and so forth other than a lung. For example, when a contrast medium is present in blood vessels, the inside of the blood vessels can be clearly visualized, but it is difficult to clearly calculate the outer side and thickness of blood vessels. According to the present embodiment, the periphery can be precisely detected, and thus the feature and shape of blood vessels within the analysis range can be calculated. Accordingly, it becomes possible to be used for diagnosis by quantitatively grasping the thickness and outer circumference of blood vessels that have been conventionally difficult to be grasped in the past.

[Preparation of Block Area]

Figure 1B:
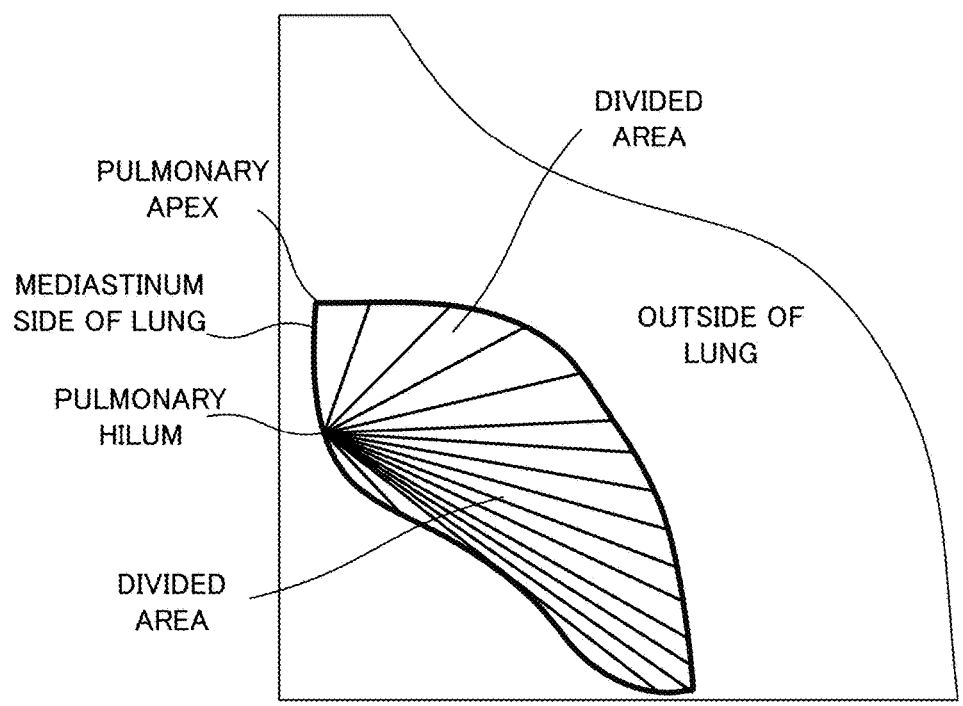
FIG. 1B is a diagram showing an example of a division method of a lung area.

A method of dividing the lung field into a plurality of block areas will be explained. FIG. 1B is a diagram showing a method of dividing the lung field radially from the pulmonary hilum. As to the lung, the diaphragm side moves more greatly than the pulmonary apex side, and thus, it may also be possible to plot points that are divided more coarsely, the nearer the diaphragm side. In addition, in FIG. 1B, lines (dot lines) in the vertical direction may be additionally drawn to be divided into a plurality of rectangular (square) block areas. Accordingly, it becomes possible to more accurately represent the movement of the lung. In addition, it is also possible to divide a lung thereinto by using the methods such as "a method of transversely dividing the lung by plotting points in the vertical direction of the lung", "a method of vertically dividing the lung by plotting points in the transverse direction of the lung", "a method of drawing a tangent line at the pulmonary apex portion and a tangent line at the diaphragm to determine the point of intersection between the foregoing tangent lines as a center point, and dividing the lung by line segments drawn from a straight line (for example, a vertical line) including the point at certain fixed angles", "a method of cutting the lung on a plurality of planes perpendicular to a straight line connecting the diaphragm end portion from the pulmonary apex (or pulmonary hilum)", and so forth. These methods are also applicable to three-dimensional stereoscopic images. In the case of 3D, each organ is captured as a space enclosed by a plurality of curved planes or flat surfaces. The organ can also be divided more finely. For example, when a 3D model of a right lung is taken into consideration, handling can be separately carried out for an upper lobe, a middle lobe and a lower lobe.

Figure 1C:
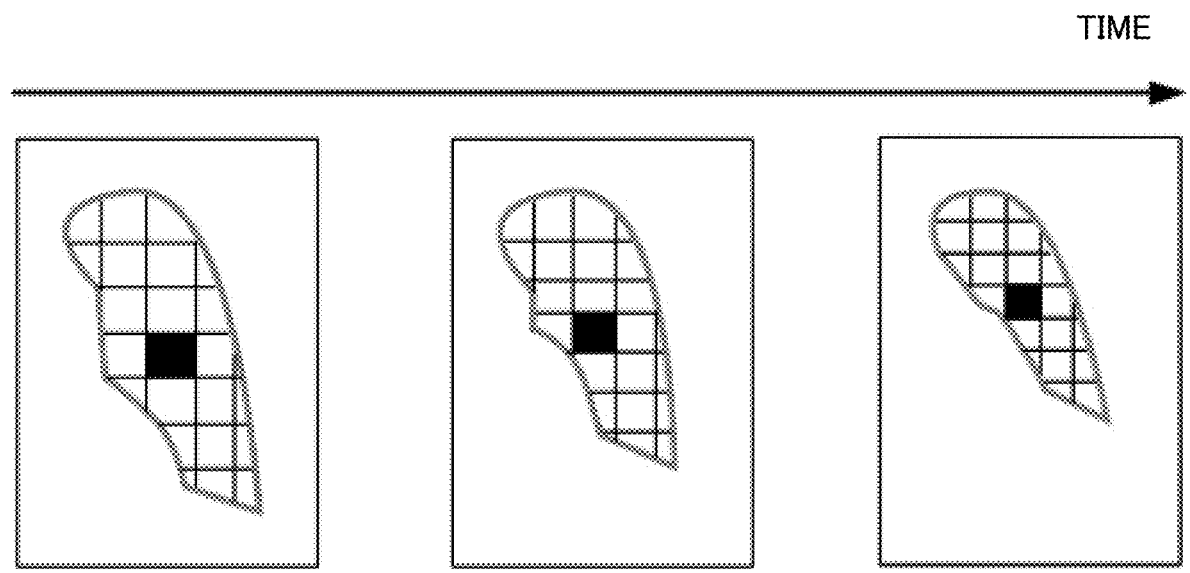
FIG. 1C is a diagram showing states each where a form of a lung changes with the lapse of time.
Figure 1D:
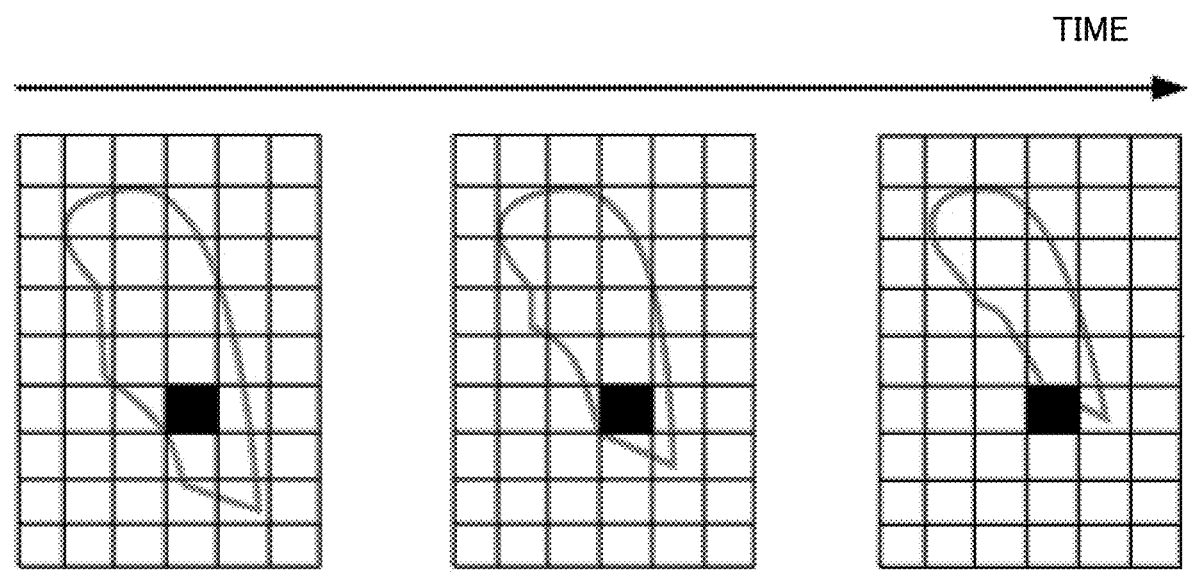
FIG. 1D is a diagram showing states each where a form of a lung changes with the lapse of time.
Figure 10:
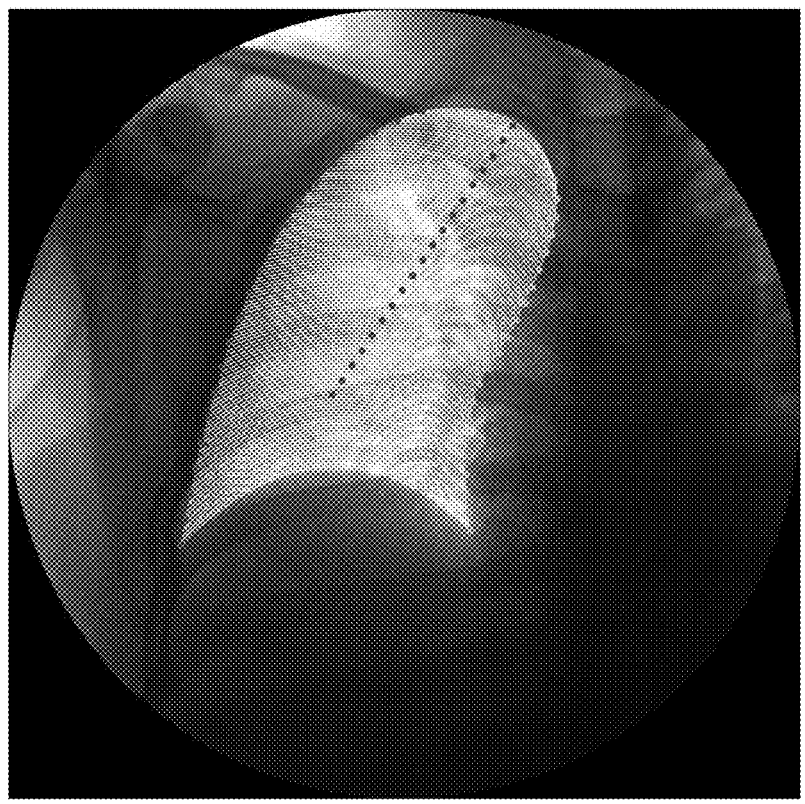
FIG. 10 is a diagram showing an example of drawing a lung field using Bezier curves.

As to the lung field area, the movement of the thorax, the movement of the diaphragm and the position relationship of blood vessels in the entire lung field are identified and the relative position of the lung contour is grasped, and the evaluation should be relatively made based on the movement. Thus, in the invention according the present application, after automatically detecting the lung contour, the area specified by the lung contour is divided into a plurality of block areas to average the value (pixel value) of the change of an image included in each block area. For example, as shown in FIG. 10, while plotting points on the periphery of opposing lungs on Bezier curves, and connecting these, it is also possible to use curves passing through each intermediate point therebetween. As a result of this, as shown in FIG. 1C, even though a form of the lung changes over time, it becomes possible to track changes of the area of interest with the lapse of time. On the other hand, FIG. 1D is a diagram showing changes with the lapse of time in the case of being divided into block areas, without taking into consideration a form of an organ (a lung in this case) as being an analysis target. As to the lung field area, the movement of the thorax, as described above, the movement of the diaphragm and the position relationship of blood vessels in the entire lung field are identified and the relative position of the lung contour is grasped, and the evaluation should be relatively made based on the movement, but as shown in FIG. 1D, when being divided into block areas without specifying a lung field, due to a change of the lung with the lapse of time, and the area of interest falls outside the lung field area, thereby resulting in a meaningless image. Specifically, since the movement of a diaphragm exhibits strong movement by which the lung field is shrunk, only a diaphragm and overall numerical values should not be corrected, but it is preferable to correct the lung field by incorporating a thorax component and a plurality of other elements therein. Further, there is a method of inputting a respiratory element frequency or a frequency band. The calculation of the area division can be similarly carried out for 3D as well.

Figure 11:
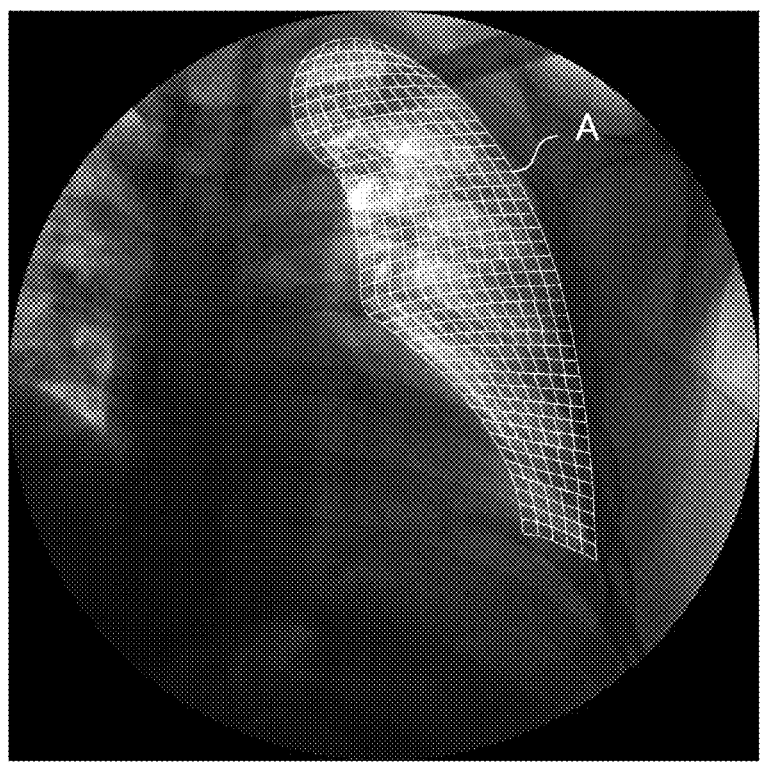
FIG. 11 is a diagram showing an example in which a lung field is divided thereinto using Bezier curves.
Figure 12:
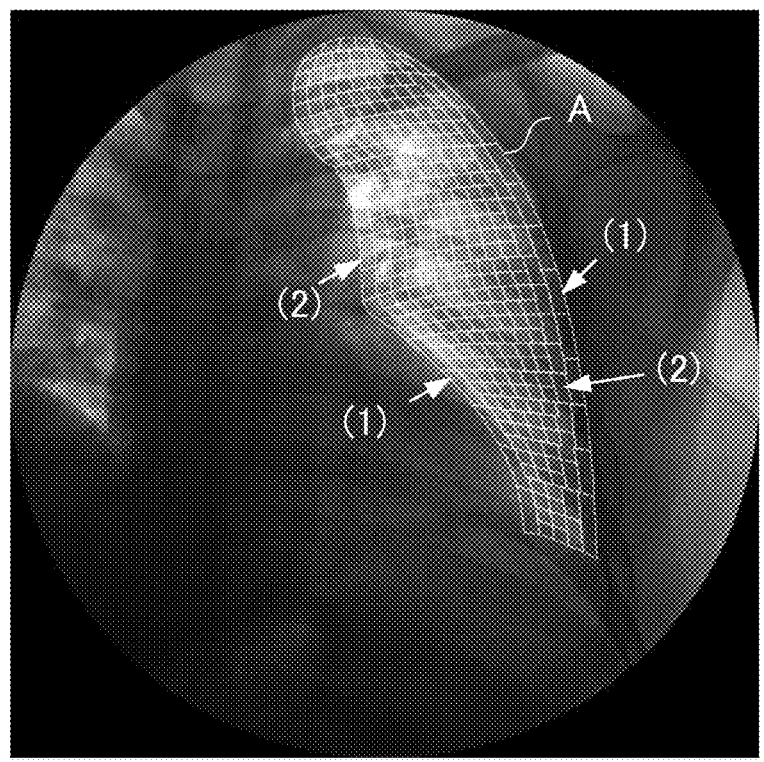
FIG. 12 is a diagram showing an example in which a lung field is divided thereinto using Bezier curves.

Further, as shown in FIG. 11, it is also possible that in a lung field A, using Bezier curves, internal control points are selected inside the detected lung field, and the lung field is divided by curves or straight lines passing through the internal control points inside the lung field. That is, control points are provided not only on the frame of the lung field but also inside the lung field area, the lung field area (A) is divided thereinto by using these control points. In this case, as shown in FIG. 12, an interval between control points at an outer extension of the detected lung field and near the outer extension may be made to be relatively large (1), and an interval between the internal control points may be made to be relatively small according to an expansion rate for each region inside the detected lung field (2). Further, in the lung field A, an interval between the control points may be made to be relatively larger toward a craniocaudal direction with respect to a human body, or to be relatively larger toward a specific vector direction. How to determine this vector is arbitrary, but for example, it may be determined to be in the direction toward the opposite side of the lung field from the pulmonary apex, and be determined to be in the direction toward the opposite side of the lung field from the pulmonary hilum, as shown in 1B. It is also possible to determine the vector in the direction according to a structure of the lung. In such a manner, it becomes possible to display an image for which a feature of each area is taken into consideration, by making how to divide the lung field be "unequal division". For example, the outer circumference of the lung field is large in movement and a deviation thereof becomes large, and thus blocks are made to be set large. On the other hand, the inside of the lung field is small in movement and the deviation also becomes small, and thus blocks are made to be set small and fine. Further, for example, the diaphragm side of the lung field is large in movement and a deviation thereof becomes large, and thus blocks are made to be set large. On the other hand, the head side of the lung field is small in movement and the deviation also becomes small, and thus blocks are made to be set small and fine. As a result of this, it becomes possible to improve display accuracy. This method is not limited to the lung field, and is possible to be applied to the dynamic region linked with the respiration, or the like. Such a method is applicable to the case where the lung is three-dimensionally divided into each lobe of the lung. Further, it is also applicable to the case where the regions on the lower side of the diaphragm, for example, a heart and other organs are enclosed by Bezier curves, and displayed. In this case as well, it is also possible to unequally divide the area by determining a vector in the direction according to a structure of each of the heart and the other organs.

Next, the artifact is eliminated to interpolate the image data. That is, when a bone or the like is included within the analysis range, it is represented as a noise, and thus, it is desirable to remove the noise therefrom by using a noise-cut filter. According to X-ray images, conventionally, air and a bone are set as −1000 and 1000, respectively, and thus a high permeability portion exhibits a low pixel value and is displayed black, and a low permeability portion exhibits a high pixel value and is displayed white. For example, When displaying the pixel value by 256 gradations, black becomes 0, and white becomes 255. In the lung field area, X-rays easily transmit the periphery at the position where blood vessels and a bone are not present, and thus the pixel value of an X-ray image becomes low and the X-ray image becomes black. On the other hand, X-rays hardly transmit the position where the blood vessels and the bone are present, and thus the pixel value of an X-ray image becomes high and the X-ray image becomes white. The same thing can also be applied to other CT and MRI. Herein, from the results obtained by the cycle analysis of the above-described respiratory element, it becomes possible to eliminate the artifact by interpolating data by using values in the same phase, based on a waveform per respiration. Further, when detecting that "coordinates are different therefrom", "the pixel value is extremely varied", or "frequency and density abnormally become high", cut-off is carried out for these, and with respect to the remaining obtained images, this may be easily used for Hz calculation of the diaphragm and adjustment of the lung field, for example, by identifying the continuously smooth waveform using a least squares method and so forth. Further, when superimposing an image thereon, there are provided (1) the case where acquired comparison images obtained by acquiring each image before and after are superimposed with the coordinates themselves, and (2) a method of superimposing relative position information on a base by relatively extending images, after acquiring each image before and after to the base. By using the methods as described above, it becomes possible that a form of the lung field is corrected, and changes in image in block areas are corrected. At this time, the artifact with respect to the results is eliminated again, and extracting the function is carried out via extraction from the new data extraction waveform, the data waveform that becomes the first base, another waveform of modality or the like, the periphery, and the waveform of plural times. In this case, the number of times may be once or plural times.

Herein, "reconstruction" in the time axis will be explained. For example, when inspired air time of 15 f/s is 2 seconds, 30+1 images are obtained. In this case, the "reconstruction" for each 10% can be carried out if 3 images are simply superimposed at each time. At this time, for example, 0.1 seconds indicate 10%, and the case where the image acquires only a photograph of each of 0.07 seconds and 0.12 seconds needs "reconstruction" of 0.1 seconds. In this case, an intermediate value in images of before or after 10%, a (average of both) value, is given to carry out "reconstruction". Further, the time axis is taken, and the coefficient may be changed at a ratio of the time. For example, when there is no photographing value of 0.1 seconds due to the presence of the time axis difference, and there is a photographing time of each of 0.07 seconds and 0.12 seconds, recalculation is made as "(a value of 0.07 seconds thereof)×⅖+(a value of 0.12 seconds)×⅗" to perform "reconstruction". Further, from a change amount of an average of the respiration and a coefficient of the diaphragm, the change position relationship at this number of seconds is recognized and the value is taken as a coefficient to find a numeral ratio. In addition, it is desirable to include 0 to 100% of "Maximum. Differential Intensity Projection", and to perform calculation by providing ranges such as "reconstruction" of 10 to 20%, "reconstruction" of 10 to 40%, and so forth. In this manner, it is also possible to carry out "reconstruction" at a ratio of one respiration for the unphotographed portion. In addition, according to the present invention, it is also possible to carry out "reconstruction" similarly to not only the respiration but also the blood flow, the movement of the thorax, the diaphragm and a series of movements linked with those other than these. It is also possible to carry out "reconstruction" for each block or for each pixel. In addition, it is desirable to include 0 to 100% of "Maximum Differential Intensity Projection", and to perform calculation by providing ranges such as "reconstruction" of 10 to 20%, "reconstruction" of 10 to 40%, and so forth.

Further, the lung field is detected by the above-described method, and the detected lung field may be normalized. That is, the detected lung field is spatially normalized, or time-normalized using reconstruction. The size and shape in lung field differ therefrom, depending on the difference between human bodies, but it enables displaying within a fixed range to normalize this.

[Diaphragm and Thorax]

It also becomes possible to grasp the movement of the diaphragm as well as the thorax by identifying the lung field as described above. That is, positioning of the function evaluation can be performed from the image by calculating curves of the thorax as well as curves of the diaphragm on Xp (2D image) of the recognized diaphragm as an aggregate of detailed coordinates, and by digitizing a change rate and a change amount of the average or toward the downward direction at the local part of the curve, and also a deformation rate via "curve fitting" carried out for the diaphragm as curves. Further, the function evaluation can be similarly performed from the image by calculating curves on the periphery thereof, that are drawn in the chest other than the diaphragm as an aggregate of detailed coordinates, and by digitizing the change rate of the average and the curve. The function evaluation of movement is performed by evaluating the above-described two change rate and change as being relatively interlinking, and digitizing and imaging (the immovable region linked therewith in a similar manner, or the like) having a different change rate.

Herein, "a method of evaluating a diaphragm and a thorax" will be explained. First, as to the diaphragm, a horizontal line showing right and left, that is orthogonal to an axis (so-called median line) of a body is taken as an axis to display the movement. Next, a line of the diaphragm is flattened as a base line. That is, the line of the diaphragm is matched to the horizontal line. Then, the movement of the diaphragm is evaluated. Further, the line of the diaphragm is extended and flattened to evaluate the orthogonal movement of the curve. Next, outside the thorax, the movement is evaluated by having a line by which a diaphragm thorax angle is connected from the pulmonary apex as a base line. A line of the thorax is flattened as a base line, that is, the line of the thorax is matched to a line of "pulmonary apex-costophrenic angle" to evaluate the movement. The line of the thorax is extended to a base line and flattened to evaluate the orthogonal movement of the curve. Then, a curvature and a curvature radius of the thorax and the line of the diaphragm as described above are evaluated. Then, the above-described change is calculated as a "change amount", and evaluated as a "change rate" by differentiating this change amount.

FIG. 6B and FIG. 6C each are a diagram showing an example of an image displayed on a display. In FIG. 6B, the movement of a left lung is displayed as a moving image. In the image of FIG. 6B, a white horizontal line is shown, but this is a straight line (index) indicating the position of a diaphragm, and thus when reproducing the moving image, it is moved up and down while following the movement of the diaphragm. In such a manner, image diagnosis by a doctor can be performed by detecting a diaphragm, and showing an indicator indicating a position of the detected diaphragm, that is, a white horizontal line indicating the position of the diaphragm. Further, it becomes possible to diagnose the entire diaphragm, or one area of the diaphragm on the right or left side, the outer or inner side, or the like in addition to a part of the diaphragm by utilizing recognition of a line of lung field-diaphragm to recognize all points. In the similar manner, similarly to not only the diaphragm but also dynamic regions linked with the respiration, for example, the thorax and so forth, it becomes possible to determine the movement of the thorax by a line at a tangent line position or the like and a line of the thorax via lung field recognitions. In this way, on the assumption that the periphery is one that is in motion, it becomes possible to detect the periphery by taking the difference with a continuous image. For example, usually, a tumor is hard and its circumference is soft. Accordingly, the tumor does not move much but its circumference moves actively, and thus the periphery of the tumor can be detected by taking the difference.

Further, in the case of 3D images of MRI, CT and so forth as well, positioning of the function evaluation can be performed from the image by capturing the surface of the diaphragm as one coordinate or a cubic curved surface; calculating the coordinate and curves as an aggregate of detailed coordinates (a contour on the periphery of the diaphragm, or an aggregating group of flat surface and coordinates); and digitizing a change rate and a change amount of the average or toward the downward direction at the local part of the curve in addition to a deformation rate via "curve fitting" carried out for the diaphragm as a curved surface. Further, the function evaluation from the image can be performed by similarly calculating a curved surface of the periphery drawn in the chest excluding the diaphragm as an aggregate of detailed coordinates, and digitizing the average and the change rate in curved surface. The function evaluation of movement is performed by evaluating the above-described two change rate and change as being relatively interlinking, and digitizing and imaging (the immovable region linked therewith in a similar manner, or the like) having a different change rate.

[Fourier Analysis]

Figure 2A:
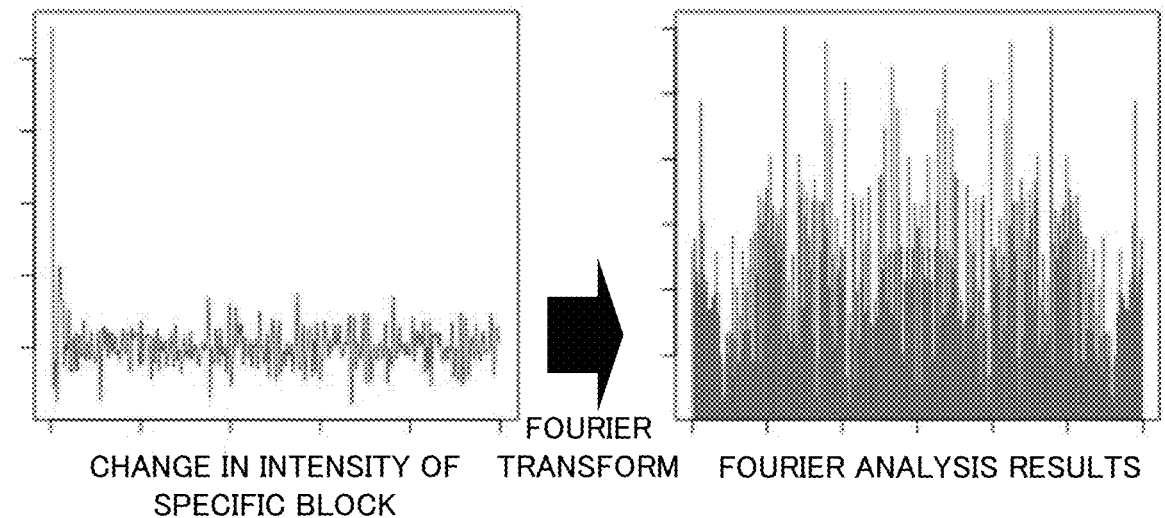
FIG. 2A is a diagram showing a change in "intensity" in a specific block and a result obtained by performing a Fourier analysis thereof.
Figure 2B:
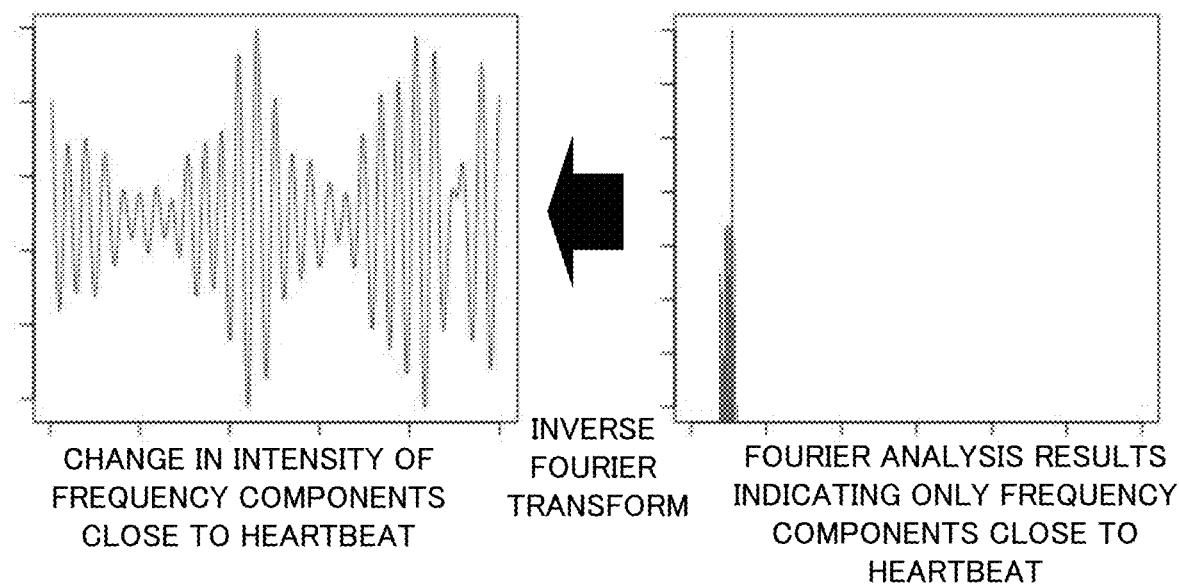
FIG. 2B is a diagram showing a Fourier transform result obtained by extracting frequency components close to a heartbeat and a change in "intensity" of frequency components close to a heartbeat, that is obtained by performing inverse Fourier transform on this.

Based on the respiratory element cycle and the blood vessel beat cycle that are analyzed as described above, a Fourier analysis is performed for the value of "density"/"intensity" in each block area and a change amount thereof. FIG. 2A is a diagram showing a change in "intensity" in a specific block and a result obtained by performing a Fourier analysis thereof. FIG. 2B is a diagram showing a Fourier transform result obtained by extracting frequency components close to a heartbeat and a change in "intensity" of frequency components close to a heartbeat, that is obtained by performing inverse Fourier transform on this. For example, when the change in "intensity" in a specific block is Fourier-transformed (Fourier analysis), the results as shown in FIG. 2A are obtained. Then, the results as shown on the right side in FIG. 2B are obtained by extracting the frequency components close to the heartbeat from the frequency components shown in FIG. 2A. By performing inverse Fourier transform on this, the change in "intensity", that is tuned to the heartbeat can be obtained as shown on the left side in FIG. 2B.

Figure 9:
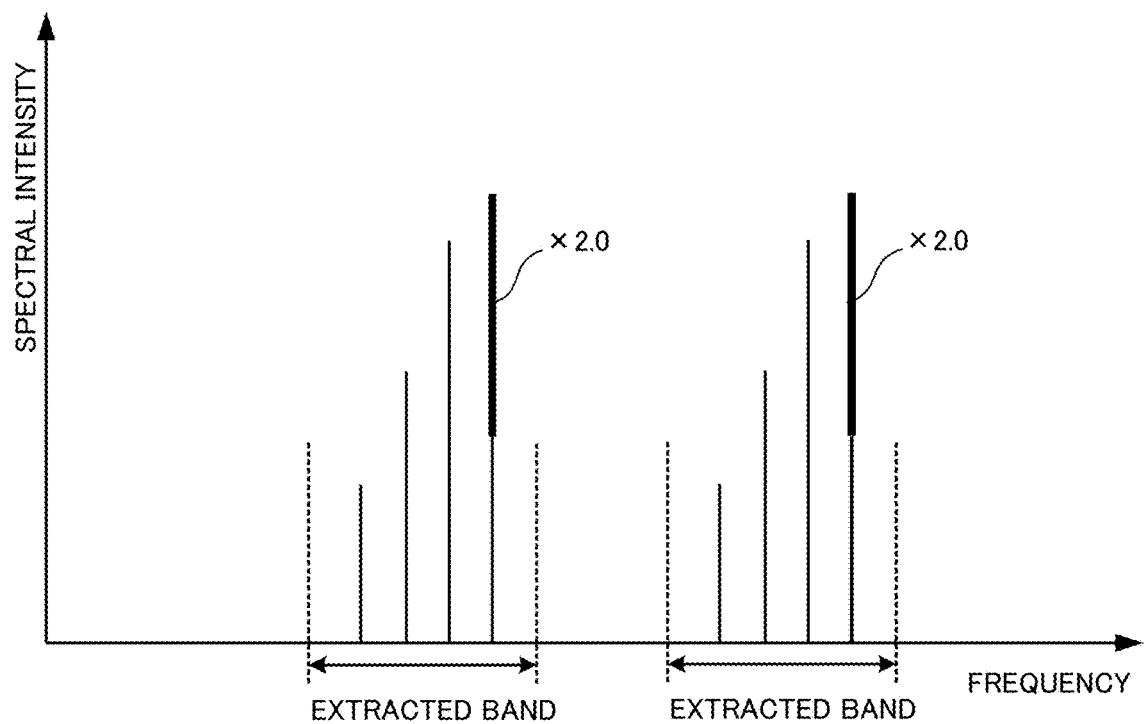
FIG. 9 is a diagram showing an example of multiplying a certain fixed spectrum by a coefficient, out of a spectrum obtained after Fourier-transforming.

As shown in FIG. 9, it is also possible that a specific spectrum is multiplied by a coefficient, and weighted. For example, it is possible to use this method in order to realize waveform tunability. That is, as to how to select a frequency when performing inverse Fourier transform, the inverse Fourier transform is performed after selecting a plurality of frequencies, and being multiplied by a ratio thereof. For example, when wishing to emphatically display a spectrum exhibiting highest frequency, it becomes possible to double the spectral intensity. In this case, continuity of frequencies is not indispensable. It is possible to select spectra present at intervals.

Further, it becomes possible to estimate the position of "density" of a heart from a form (an area of a region where a left lung is recessed from a form of lung field extraction) of the left lung (there are some cases of a right heart, in the case of situs inversus), and the position of each of a vertebral body and a diaphragm. In this case, ROI of the heart is taken to extract "density". When performing this extraction, the estimation is made with relative spectrum values of the respiration and the blood flow using a rough range. Further, there are some cases where frequencies by the respiration and another "artifact" are removed therefrom by performing "filtering" using a Hz band (a heartbeat of 40-150 Hz,≈0.67 Hz to 2.5 Hz) produced by a cardiovascular beat, or the like in advance. Further, since the position of a heart is changed according to the respiratory condition, the position of the heart is relatively changed from a form value of the thorax as the position of the thorax varies, and the more precise extraction of cardiovascular beat as well as the extraction of pulmonary hilum, large blood vessels or the like is often performed. Further, similarly to the movement of the diaphragm, there is provided a method of calculating the frequency based on a contour of a heart that is in regular motion.

Herein, when performing inverse Fourier transform on the spectrum including frequency components, the inverse Fourier transform may be performed by taking into consideration both a frequency element (respiratory frequency and cardiovascular beat frequency) specified from "density" in respiration and blood flow, and a spectrum band (BPF: a band pass filter may be used); or based on the element of either one. At least one frequency when performing inverse Fourier transform may be selected, based on a spectrum composition ratio in organ-specific cyclic change, from the spectrum obtained after the above-described Fourier-transforming. Further, it is also possible to identify a waveform of the area that becomes a specific organ or an analysis target, by a composition ratio of a plurality of frequencies obtained after the Fourier-transforming (preparation of a waveform tunable image).

In addition, it is possible to use an AR method (Autoregressive Moving average model) so that calculation is carried out in a short time when performing Fourier transform. According to the AR method, there is provided a method of using a Yule-walker equation or a Kalman filter in an autoregressive moving average model, and it is possible to make up for the calculation by using Yule-walker estimates derived therein, a PARCOR method, or a least squares method. By doing this, it becomes possible to acquire a near real time image, to assist the calculation, and to correct the artifact at a higher speed. It becomes possible to extract and display the nature of an image in each block area via such a Fourier analysis.

Further, when performing this Fourier analysis, it is possible to employ a method of using a "digital filter". That is, the "digital filter" with which an original waveform is subjected to arithmetic processing is applied thereto by Fourier-transforming on the original waveform, and acquiring parameters of each spectrum. In this case, the digital filter is used without performing inverse Fourier transform.

Figure 2C:
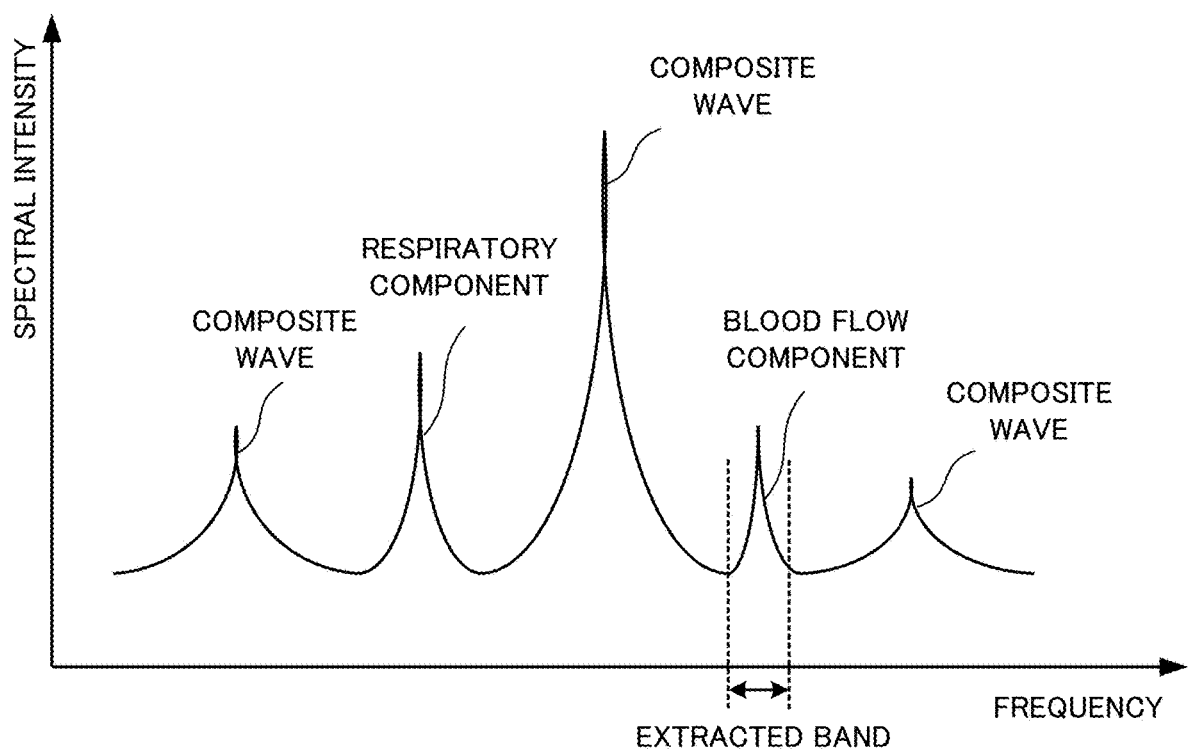
FIG. 2C is a diagram showing an example of extracting a certain fixed band out of a spectrum obtained after Fourier-transforming.

Herein, a spectrum in a fixed band including a spectrum corresponding to a cycle of the respiratory element, out of a spectrum obtained after Fourier-transforming can be extracted by Fourier-transforming a change in image in each block area in each of frame images. FIG. 2C is a diagram showing an example of extracting a certain fixed band out of a spectrum obtained after Fourier-transforming. As to a frequency f of a composite wave spectrum, the relationship of "$1/f = 1/f_1 + 1/f_2$" is satisfied between $f_1$ (respiratory component) and $f_2$ (blood flow component) of each frequency that becomes a composite source, and when extracting a spectrum, it is possible to employ the following method.

(1) The blood flow having a high spectral ratio is extracted.

(2) The spectrum is extracted via division at a middle of the peak of a spectrum corresponding to respiration/blood flow and the peak of a plurality of neighboring composite waves.

(3) The spectrum is extracted via division at the valley part of the peak of a spectrum corresponding to respiration/blood flow and the peak of a plurality of neighboring composite waves.

As described above, according to the present invention, it does not mean that a fixed BPF is used, and a spectrum in a fixed band including a spectrum corresponding to a cycle of the respiratory element is extracted. Further, according to the invention of the present application, it is possible to extract a frequency (for example, further, "density"/"intensity" in each region, and a heartbeat element obtained from a heartbeat or a blood vessel beat) other than a frequency of the respiratory element obtained from a frame image, out of the spectrum obtained after the Fourier-transforming, or a spectrum in a fixed band including a spectrum (for example, spectral model) corresponding to a frequency input from the outside by an operator Herein, in the case of a composite wave spectrum having only two components (respiration and bloodflow) as components, 50%+50% results, and in the case of three components thereof, each equivalent to one-third is distributed. Thus, the composite wave spectrum can be calculated to some extent from what percentage of the respiratory component spectrum is and what percentage of the blood flow component spectrum is, and spectral components and height thereof. It is possible to extract the spectrum at a high ratio (%) thereof. That is, a ratio of a blood flow component/respiration component to a composite wave component is calculated, and a spectral value having a high blood flow component/respiration component is calculated and extracted. In addition, as to identification of the diaphragm, there are some cases where only a spectrum or superimposed one thereof corresponding to a region in which Hz (frequency) becomes relatively constant, that is, an area in which a change in Hz is small is extracted from data obtained by acquiring frequencies of the respiration and the heart blood vessels. Further, in the case of determining a spectral band, when identifying the diaphragm, or the like, there are some cases of determining the spectral band in a range where a change in Hz is generated, and an area on the pepiphery thereof. The waveform constituent element may be often taken into consideration.

In addition, as to the spectrum when performing inverse Fourier transform, it is possible to select "the case (simulation approach) of performing extraction from the simply modeled frequency and frequency band, using a region of being high therein (at least one)", and "the case (field activity approach) of extracting a high frequency or a low frequency according to a spectral value, based on the actual frequency of frequency band". Further, when a frequency of a heart is represented by A, and a frequency of a lung is represented by B, A is subtracted from the entire frequency band to obtain B. Further, as to a spectrum obtained from Fourier transforming, it is possible to extract not only one place but also a plurality of places on the frequency axis.

As a result of this, it becomes possible to extract not only the case of being exactly consistent with the cycle of the respiratory element or the blood vessel beat cycle, but also the spectrum that should be taken into consideration, and to make a contribution to image diagnosis. In addition, it is known that "respiration" and "heartbeat" are included in a specific frequency band. Accordingly, by using for example, a filter of "0~0.5 Hz (respiratory rate 0~30 times/min.)" in the case of the respiration, and using for example, a filter of "0.6~2.5 (heartbeat/pulse rate 36~150 times/min.) Hz" in the case of the circulatory system, it is possible to specify a respiratory frequency and a frequency of the circulatory system using the foregoing filter, in advance. This enables displaying a frequency tunable image. This is because there is a case where when acquiring a change in "density" of a heart, a change in "density" of respiration (lung) is picked up, and when acquiring a change in "density" of a lung, a change in "density" of a heart is picked up.

[Visualization/Digitization]

The results of the above-described analysis are visualized and digitized. When performing visualization and digitization thereof, "modeled lung" is defined in the present specification. When displaying a lung by a moving image, the position relationship is moved, and thus the relative determination is not easily made. Therefore, deviation of the position relationship is spatially unified and averaged. For example, shape of a lung is fitted to a diagram such as a fan-shape or the like, and displayed in a state where the shape is arranged. Then, the temporal unification is made by using the concept of reconstruction. For example, "the lung condition of 20% out of a plurality of respirations" is extracted, and it is determined as "the lung condition of 20% for one respiration". In this manner, a spatially and temporally unified lung is made to be a "modeled lung". Accordingly, when comparing different patients with each other, or comparing the present of one patient with the past thereof, the relative determination is easily made.

For example, as the standard uptake, the value is often displayed relatively/logarithmically by having the average value as 1 from "density"/"intensity" in the entire area of the measured lung field. Further, since only the blood flow direction is employed, the change to a specific direction is often cut out. By doing this, it becomes possible to take out only data of a significant method. The pseudo colorization is performed following a change in analysis range by using the lung field identification result. That is, the analysis result of each individual (subject) is fitted to a relative area in accordance with a specific shape (minimum, maximum, mean, median) fitted to the phase.

Further, the deformation is made to a specific shape/phase capable of comparing a plurality of analysis results therewith. Further, when preparing the modeled lung, the relative position relationship within the lung field is calculated by using the results of the cycle analysis of the respiratory element as described above. In addition, the modeled lung is prepared by using a line obtained by comprehensively averaging the thorax lines, "density", the diaphragm and so forth of a plurality of patients. When preparing the modeled lung, in the case of the lung blood flow, the distance can be radially measured from the pulmonary hilum to the lung end portion. Further, in the case of the respiration, it is necessary to make correction according to the movement of the thorax and the diaphragm. Further, the calculation may be compositely made by taking into consideration the distance from the pulmonary apex.

Further, after performing inverse Fourier transform, only a block where an amplitude value is relatively large may be extracted and displayed. That is, when being Fourier transformed for every block, a block where a wave amplitude is large and a block where the wave amplitude is small are present after performing the inverse Fourier transform.

Then, it is also effective that only a block where the amplitude is relatively large is extracted and visualized. Further, after performing the inverse Fourier transform, a real part and an imaginary part of each numerical value each can be used properly. For example, it is possible that an image is reconstructed from only the real part; the image is reconstructed from only the imaginary part; and the image is reconstructed from an absolute value of the real part and the imaginary part.

The modeled lung may be subjected to Fourier transforming. It is also possible to use the modeled lung, when matching images of the number of times of respirations thereto, and performing a Fourier analysis to grasp the relative position. The relative position when performing the Fourier analysis is possible to be made to be constant by fitting the acquired plural frames to the modeled lung, and fitting them to the modeled lung calculated according to the heartbeat (for example, a heartbeat obtained from a pulmonary hilum portion) in the case of blood vessels. When acquiring a respiration condition that becomes a base, it also becomes possible to stably obtain the calculation results by using the modeled lung. Further, it becomes possible that by modeling the lung, the spatial difference can be fixed, and the movement of the lung is made to be easily viewed.

In imaging, the labeling method of relative evaluations is as follows. That is, the image is relatively labeled in black and white or color mapping. There is a case where a value before and after several percent of "density"/"intensity" obtained by the difference is cut, and the remaining upper and lower values are relatively displayed. Alternatively, there is a case where the value before and after several percent of the obtained difference often becomes an outstanding value, and thus this is eliminated as "artifact" to relatively display the remaining part. Displaying is often carried out as values of 0 to 100% other than a method of 0 to 255 gradations, and so forth.

In addition, the pixel is vaguely displayed to a certain extent, and a dimmed state is made and wholly displayed. Specifically, in the case of lung blood vessels, a low signal value coexists between high signal values, but if only the high signal values can be roughly grasped, it is not indispensable to be vague as a whole. For example, in the case of a blood flow, a signal having a threshold or more may have been extracted, but in the case of respiration, the signal having a threshold or more may not have been extracted. Specifically, in the case where a numerical value in the following table is taken as one pixel, and the numerical value in the center is acquired, when a ratio occupied by the numerical value in the center is acquired and averaged within one pixel, the expression thereof can be smoothly made between neighboring pixels.

TABLE 1

| 1 | 1 | 1 |
|---|---|---|
| 1 | 2 | 1 |
| 1 | 1 | 1 |

This method is also applicable when detecting not only the lung field but also density in an arbitrary analysis range, and eliminating the place where the density is relatively and largely changed. Further, the point largely exceeding a predetermined threshold is cut off. Further, recognizing a form of ribs, for example, a suddenly appearing high/low signal line is recognized and eliminated. Further, there is a case where the suddenly appearing signal, for example, a suddenly appearing signal differing from a change in ordinary wave, that exhibits a feature of a patient in which artifact is recognized at a reconstruction phase of about 15% to 20%, or the like, is similarly removed from the phase. In addition, when taking the base data at first, there is a case of being a different phase in the calculation of (diaphragm)≈(thorax)≈(movement of thorax)≈(spirometer)≈(lung field), (density) of field≈(volumetry), and so forth; and there is a case where the phase is fitted to an actually recognizable form (contour of XP).

After the modeled lung is prepared, as described above, it becomes possible that tunability, a concordance rate, and a non-concordance rate are digitized and presented (display of frequency tunable image or wavelength tunable image). By doing this, it can be displayed to depart from a normal state. According to the present embodiment, discovery of a possibility of a new disease, comparison with oneself in the normal state, comparison of a hand with a foot, and comparison of another hand and another foot on the opposite side are made to be possible by performing a Fourier analysis. Further, it becomes possible to grasp which portion is abnormal in movement of the foot, deglutition or the like by digitizing the tunability. Further, it becomes possible to determine whether or not a person in the disease state has changed after a fixed time elapses, and to compare the states before and after the change in the case where the person has changed. Further, evaluating an inner layer—an intermediate layer, an outer layer and so forth can be easily carried out, and is possible to be expressed according to "peripheral predominance" or "intermediate layer predominance" by making the lung field be such a form (round shape to oval) that is easily viewed radially while the distance from the periphery remains fixed.

In addition, during the visualization, it is also possible that an image after Fourier transforming and an image before Fourier transforming are switched and displayed, and both of them are arranged and displayed on one screen.

Figure 2D:
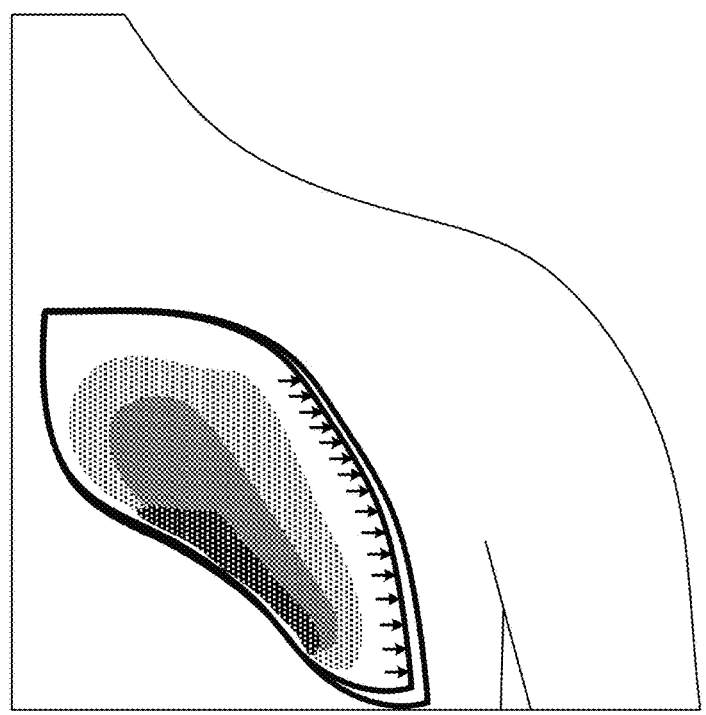
FIG. 2D is a diagram schematically showing a change rate of a lung.
Figure 2E:
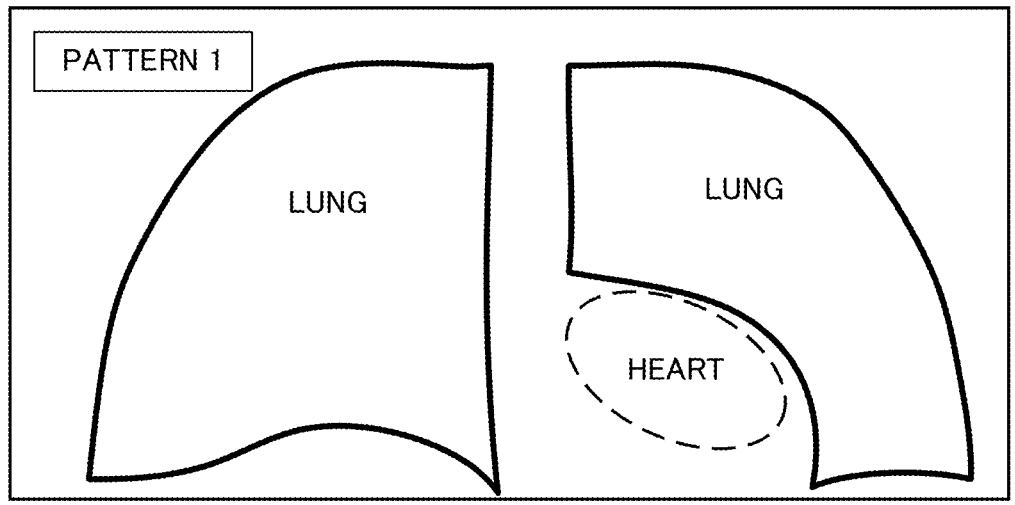
FIG. 2E is a diagram showing an example of a pattern image of a lung field area.
Figure 2F:
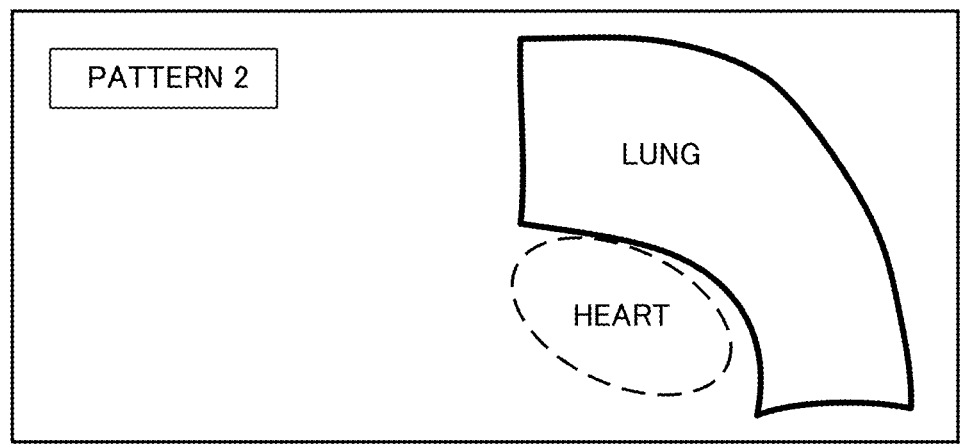
FIG. 2F is a diagram showing an example of a pattern image of a lung field area.
Figure 2G:
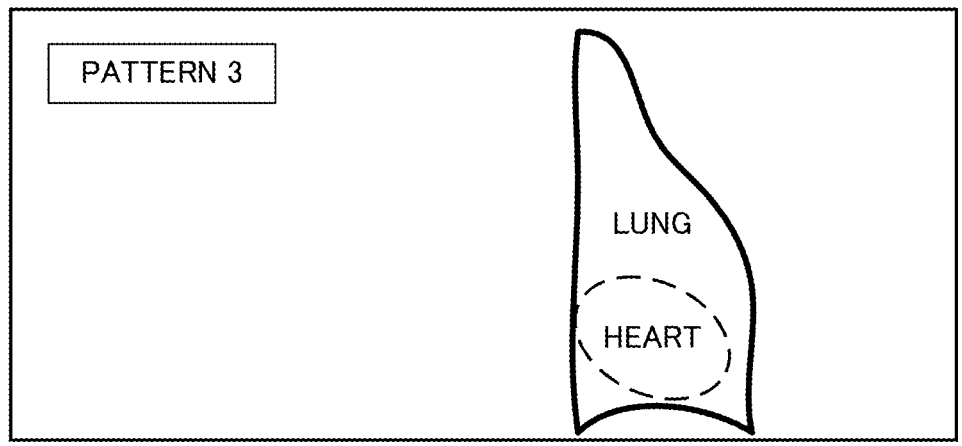
FIG. 2G is a diagram showing an example of a pattern image of a lung field area.

As shown in FIG. 2D, it becomes possible to grasp how many percents of difference appear in the human body when the modeled lung is set to 100 to display a change rate. In addition, it is also possible to grasp the difference for not only the entire lung but also part of the lung. Specifically, as described above, it is possible to y only the movement of the diaphragm; to display the movement of the diaphragm by fixing the shape of the lung field other than the diaphragm; and to display a tunable concordance rate and a change rate. In addition, it is also possible to specify the standard blood flow by performing "Variation classification". That is, it becomes possible to specify the cycle of the respiratory element, to calculate the relative position relationship of blood vessels, and to specify the blood flow dynamic state of a subject as the standard blood flow.

Figure 2H:
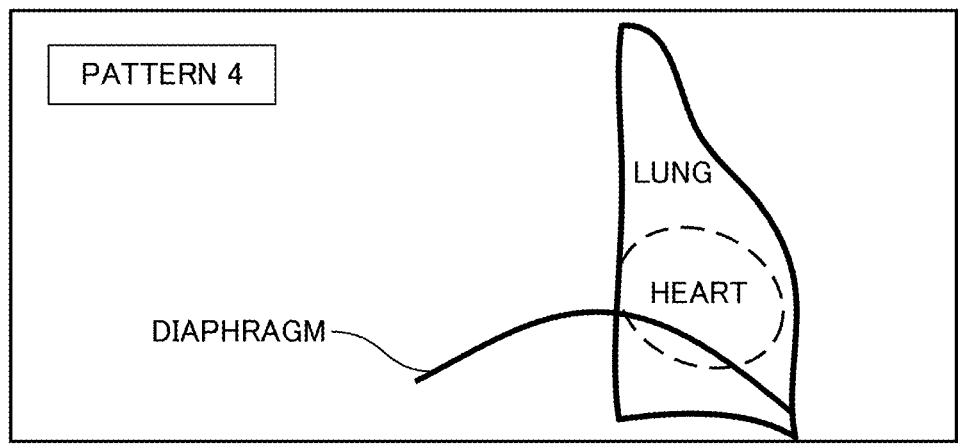
FIG. 2H is a diagram showing an example of a pattern image of a lung field area.

Further, the lung may be detected by using a pattern matching method. FIGS. 2E to 2H each are a diagram showing an example of a pattern image of a lung field area. As shown in FIGS. 2E to 2H, the shape of the lung is pattern-classified in advance, and a closely matching one among these may be extracted. This method can specify whether the target image shows one lung or both lungs. Further, whether to be a left lung or a right lung can also be specified. The number of patterns is not limited, but it is estimated to have 4 to 5 patterns. In addition, in such a manner, there is also a method of recognizing a right lung, a left lung, or both lungs only by a form (shape) of a lung field. Further, it is also possible to utilize a method of recognizing a right or left lung, or both lungs from the position relationship with a belt-shaped permeability degradation region and the position relationship with a "hyperpermeability region" of the lung field by recognizing a thick belt-shaped "permeability degradation region" by centrum/mediastinum. Further, as shown in FIG. 2H, this method can also be applied to an area on the lower side of the diaphragm. In this manner, it also possible to recognize the area on the lower side of the diaphragm as well as a heart.

Further, air exhibits highest permeability and is a region exhibiting higher permeability than the lung field, and thus it is desired to be calculated by also taking air into consideration. That is, the following determination can be made by the position of air on the screen.

The case of (the area of air upper right on the screen)>(the area of air upper left on the screen) recognizes a left lung. This is because as to the shoulder periphery, the area of air outside a human body becomes larger on photographing.

The case of (the area of air upper left on the screen)>(the area of air upper right on the screen) recognizes a right lung. Similarly to those described above, this is also because as to the shoulder periphery, the area of air outside a human body becomes larger on photographing.

Next, the case of (the area of air upper right on the screen)≈(the area of air upper left on the screen) recognizes both lungs. This is because the right and left areas of air each are at the same level.

In addition, air of intestinal tract often enters beneath a diaphragm, and in this case, there is a case of not being recognized. Accordingly, it is also possible to roughly recognize, at first, a lung field and a permeability degradation region on the periphery thereof, on the sides of mediastinum, heart, diaphragm and so forth, from the central part of the lung field; and to recognize an edge of the lung field, or the line thereof. As to this method, it is also possible to use a technique disclosed in, for example, "https://jp.mathworks.com/help/images/examples/bloc k-processing-large-images_ja_JP.html".

This enables comparison of a patient with another patient as well as digitization thereof. Further, a comparison of a normal lung or normal blood vessels with a typically abnormal pulmonary function or an abnormal blood flow as well as digitization thereof are enabled. Further, as a relative evaluation of the pulmonary function and the lung blood flow at different times for a patient, it becomes possible to use the modeled lung and the standard blood flow. The modeled lung and the standard blood flow in this manner are possible to be used as indexes at the time of evaluation made by being morphologically applied to a certain patient by collecting the typical examples of various types of typical patients and healthy persons for the modeled lung and the standard blood flow.

[Drawing of Lung Field]

In general, the lung field includes ribs exhibiting low permeability, and thus it is difficult to mechanically identify the contour of the lung as having only "density" as an index. Now, in the present specification, employed is a method of adjusting a lung contour so as to obtain a high matching property by tentatively drawing the contour of the lung field using a combination of Bezier curves and straight lines.

For example, when a contour of a left lung is expressed with 4 Bezier curves and one straight line, it becomes possible to draw a lung contour by finding 5 points on the lung contour and 4 control points. It becomes possible to detect the lung contour with high accuracy by displacing the position of a point to draw a plurality of lung contours, and evaluating a matching property using a condition under which "the total value of "density" inside the contour becomes the maximum", a condition under which "the difference of a sum in "density" for a few pixels inside and outside the contour line becomes the maximum", or the like. In practice, it is also possible to identify positions of a few points from the contour above the lung whose edge is easy to be detected, and the position of the diaphragm detected by the after-mentioned method, thereby being able to suppress the number of the above described simulation trials. It is also possible to extract the point near an outer edge by contour extraction via classical binarization, and to adjust the control point position of a Bezier curve using the least squares method or the like.

Figure 3A:
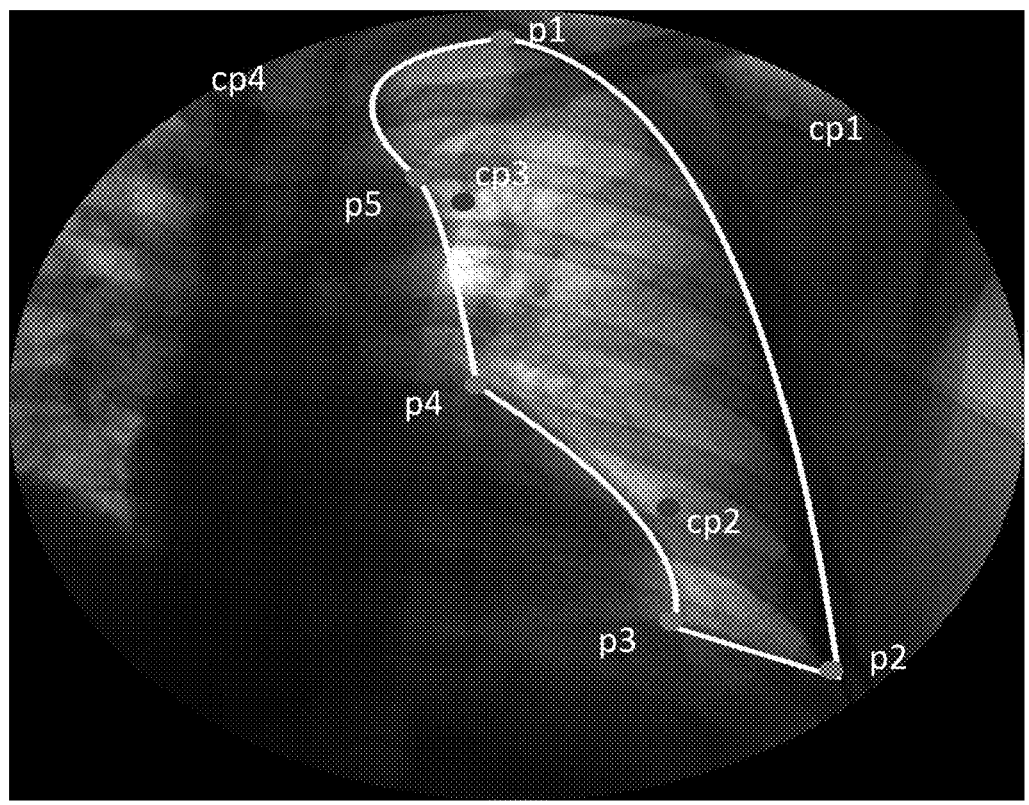
FIG. 3A is a diagram showing an example of drawing a contour of a lung field using both Bezier curves and straight lines, and showing the lung field that is in the maximum state.
Figure 3B:
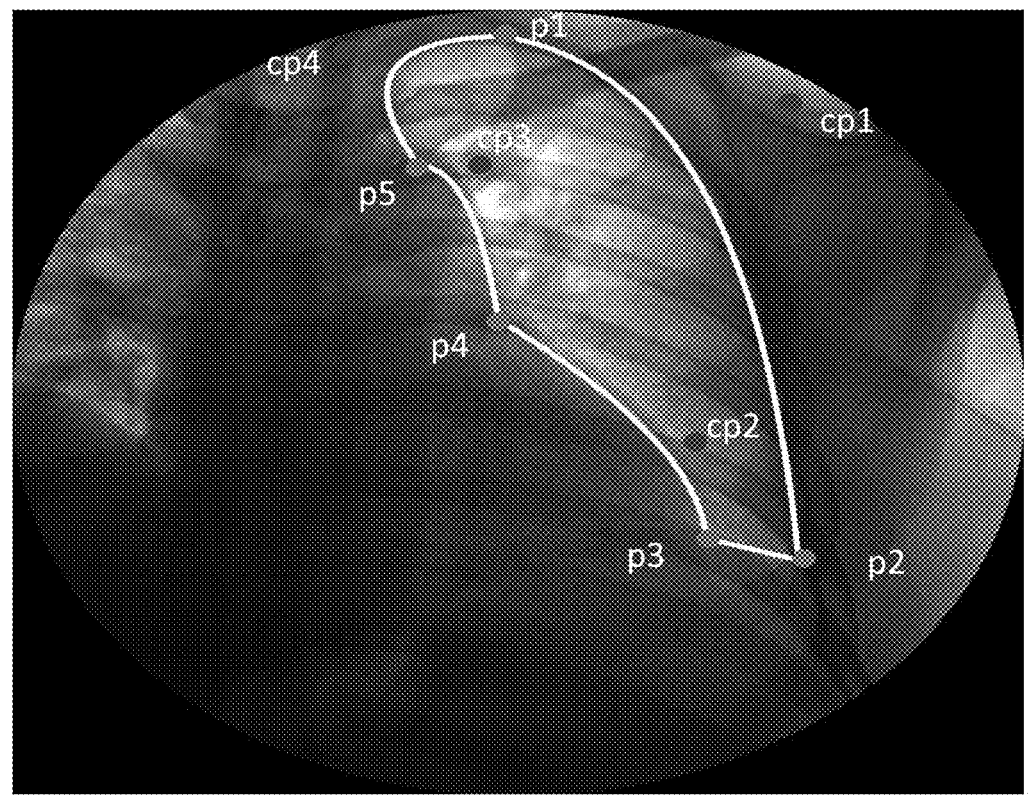
FIG. 3B is a diagram showing an example of drawing a contour of a lung field using both a Bezier curve and a straight line, and showing the lung field that is in the minimum state.

FIGS. 3A and 3B each are a diagram showing an example of drawing a contour of a lung field using both Bezier curves and straight lines. FIG. 3A shows the case where the area of a lung becomes the maximum (maximum contour). FIG. 3B shows the case where the area of the lung becomes the minimum (minimum contour). In each figure, "cp1~cp5" represents a control point, and "p1~p5" shows a point on a Bezier curve or a straight line. In this manner, it becomes possible to find the contour on the way via calculation by grasping the maximum contour and the minimum contour. For example, it becomes possible to display the states of 10%, 20% . . . of respiration. In this way, according to the present embodiment, it becomes possible to draw at least a lung field, blood vessels or a heart using at least one Bezier curve. In addition, the method as described above is not limited to the lung, but is applicable to other organs as "detection of an organ". Further, for example, it is possible to execute processing of detecting a range corresponding to an analysis range in another frame, using at least one Bezier curve, on a predetermined analysis range (a tumor, hypothalamus of a brain, basal ganglion, a boundary of inclusion, and so forth) in a specific frame.

Further, also applicable are not only planar images but also stereoscopic images (3D images). It becomes possible to set the range surrounded by a plurality of curved surfaces to an analysis target by defining a curved surface equation to set the control point thereof.

[Detection of Movement of Dynamic Region Linked with Diaphragm or Respiration]

It is possible to detect movement of a dynamic region linked with a diaphragm or respiration in successively photographed images. As to the successively photographed images, when selecting images at arbitrary intervals, and calculating the difference between the images, the difference in the case of an area where contrast is particularly large becomes large. The areas where the movement has existed can be detected by appropriately visualizing this difference. During the visualization, continuity of the areas where an absolute value in difference is large can also be emphasized by curve fitting or the like for which noise elimination by a threshold, a least squares method or the like is utilized.

Figure 4A:
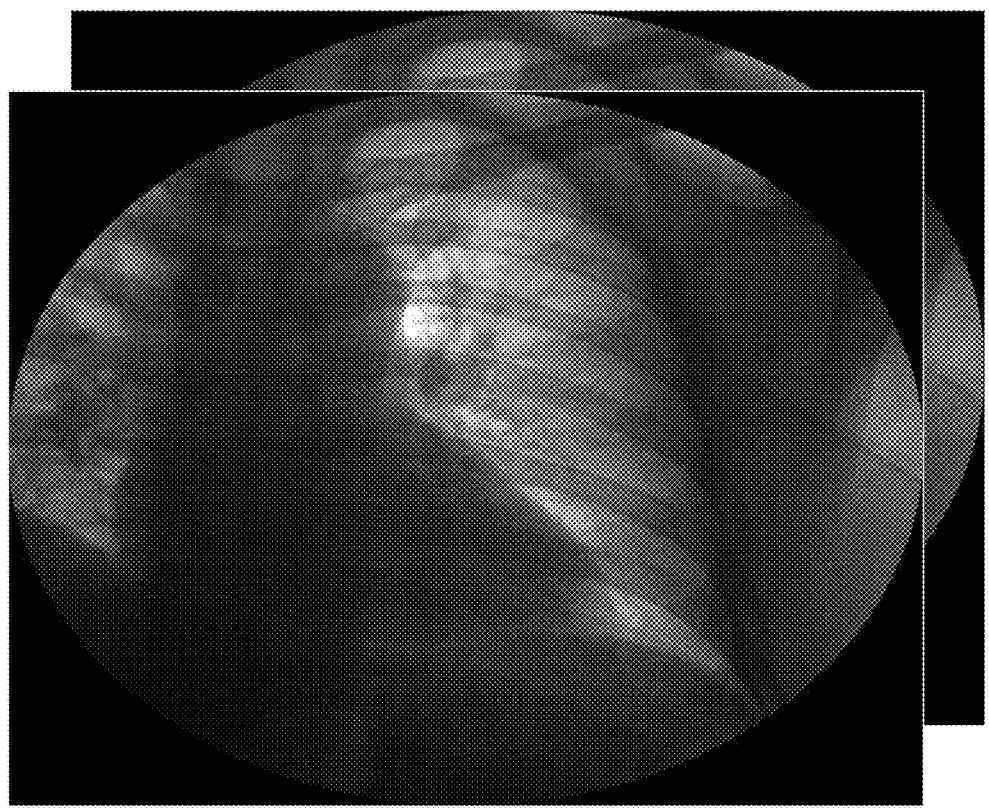
FIG. 4A is a diagram in which those before and after an image of a lung field are superimposed, between the previous frame and the next frame.
Figure 4B:
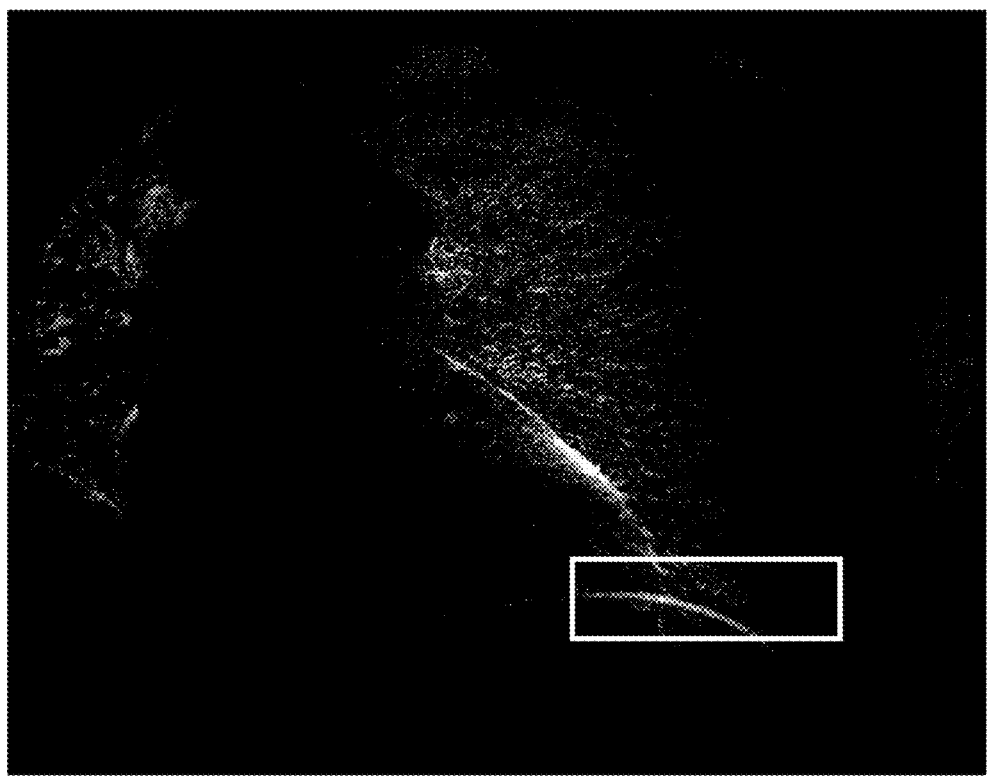
FIG. 4B is a diagram showing a state where "a line exhibiting a strong gap" therebetween is generated, as a result of taking a difference between two original images according to FIG. 4A.

According to a lung field, the contrast on a line with which a diaphragm and a heart come into contact is outstanding, and as shown in FIG. 4A, when a difference in two lung images is taken to visualize the difference by setting a fixed threshold, the line with which the diaphragm and the heart come into contact can be visualized, as shown in FIG. 4B.

[Estimation of Movement of Diaphragm]

The present method is possible to detect the position of a diaphragm when the diaphragm is in motion, but it is difficult to detect a place where the movement of the diaphragm becomes gentle. That is, it is difficult to be detected in timing at which expired air and inspired air change over, while stopping breathing, immediately after starting photographing, and immediately before completion thereof. According to the present method, the movement of the diaphragm is estimated using an optional complementing method.

Figure 4C:
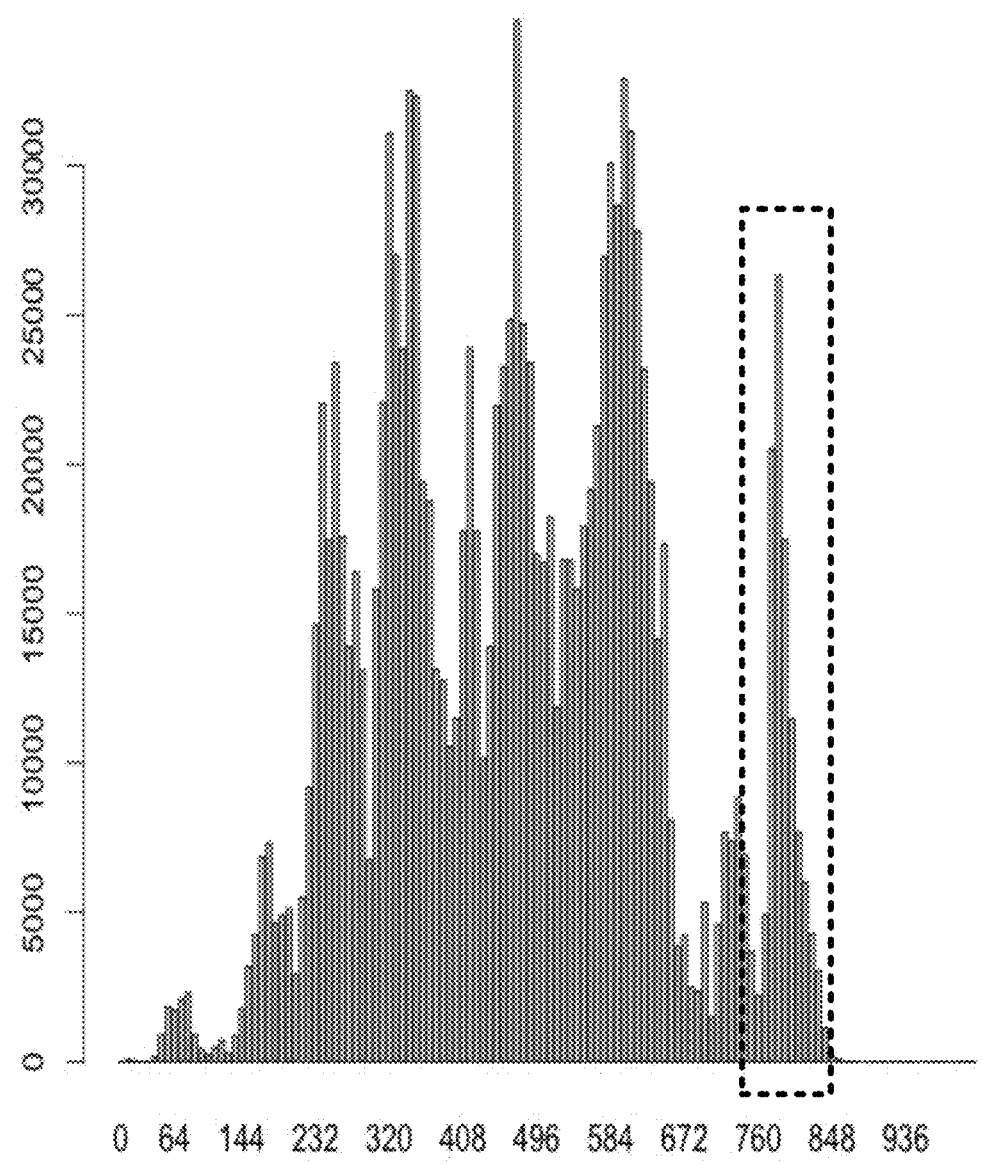
FIG. 4C is a diagram showing the difference value of a sum in "density" of "intensity" values at each position in the up-and-down direction of an image in FIG. 4B.

After visualizing a diaphragm line as shown in FIG. 4B by using the foregoing method, an image having vertical 1024 px has been divided into 128 rectangles for every vertical 8 px, and a signal value contained in each rectangular area has been totaled to make a bar graph as shown in FIG. 4C. A peak closest to the lower coordinate among a plurality peaks, that is shown in a dotted-line rectangle, is expected to indicate the position of the diaphragm. According to a conventional standing XP image, the diaphragm is displayed as a curve, but this coordinate is made to approximate the position of the diaphragm.

Figure 5:
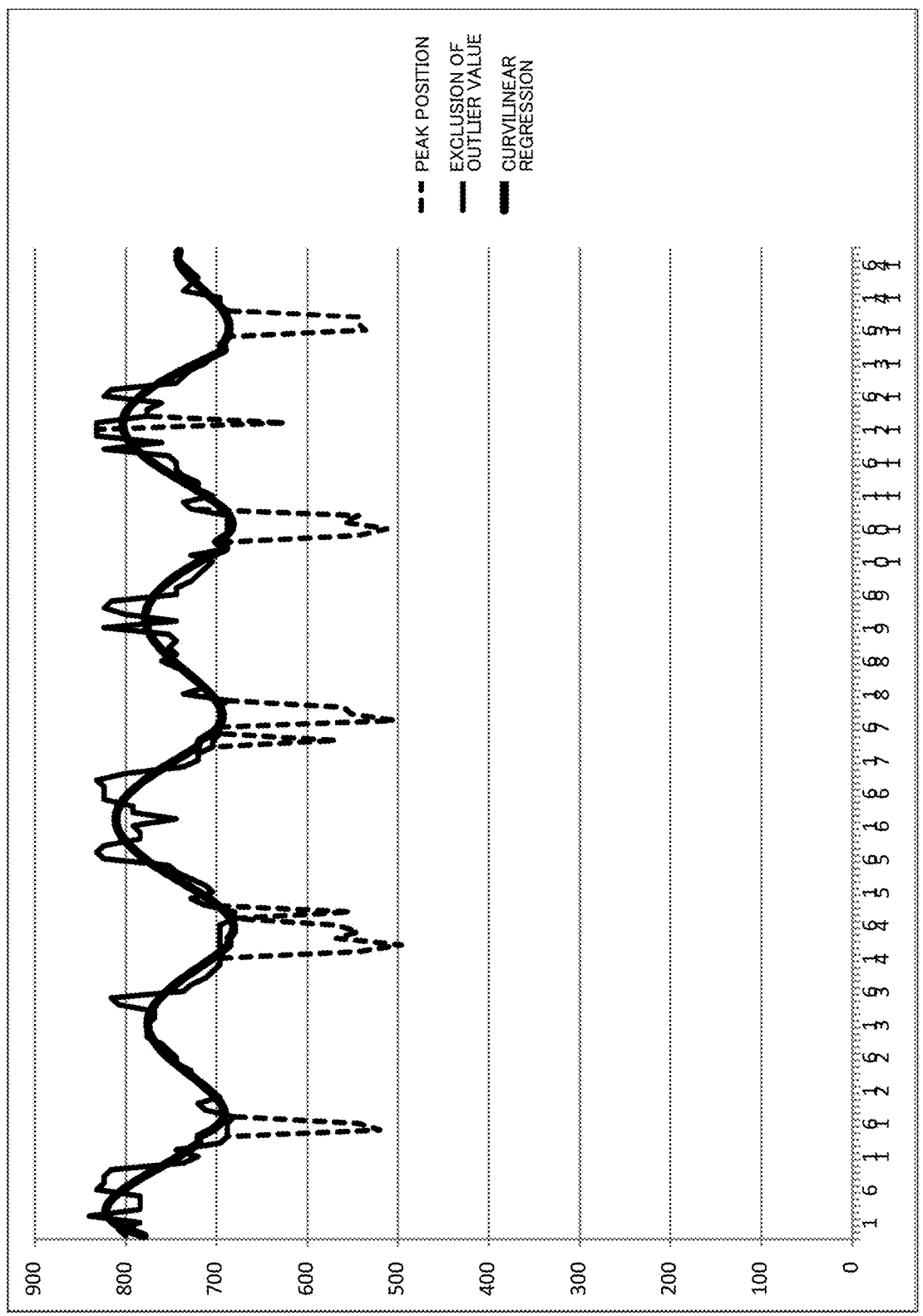
FIG. 5 is a diagram showing the result obtained by approximating the relative position of a diaphragm by carrying out curve regression.

The "peak positions" have been detected as described in FIG. 5 by detecting the position of the diaphragm for the entire image using the present method. This detected value is corrected to estimate the movement of the diaphragm. First, when the difference is larger than a fixed value, exclusion thereof is made by being regarded as an outlier value (a thin solid line in FIG. 5). The data from which the outlier value is excluded has been divided into arbitrary clusters, and each of the clusters has been subjected to biquadratic curvilinear regression to connect the results with each other (a solid line in FIG. 5). The regression analysis has been carried out in the present analysis, but the present invention is not limited thereto, and it is possible to use an optional complementing method such as spline interpolation or the like.

[Refinement of Detecting Dynamic Region]

There is a case where contrast in a dynamic region is not uniform along a line. In this case, a shape of the dynamic region can be more precisely detected by changing a threshold used for eliminating a noise, and performing processing of detection plural times. For example, according to a left lung, the contrast on the line of the diaphragm tends to be weaker toward the inside of a human body. In FIG. 4B, the right half of the diaphragm can only be detected. In this case, the remaining part that is the left half of the diaphragm can also be detected by changing setting of the threshold used for eliminating the noise. It becomes possible to detect a shape of the entire diaphragm by repeating this processing plural times. The present method also enables digitizing not only the position of the diaphragm but also a change rate and a change amount of a line and a surface concerning a shape, and making use of the new diagnosis.

It becomes possible to utilize the position or shape of the diaphragm detected in this manner. That is, according to the invention of the present application, it is possible to graph coordinates of the diaphragm; to calculate the coordinates of the thorax as well as the diaphragm using curves (surfaces) or lines calculated as described above; and to graph the heartbeat, the blood vessel beat, "density" in lung field and so forth as the position corresponding to a cycle, or the coordinates. Such a method is applicable to the dynamic region linked with the respiration.

When not only Hz in each of expired air and inspired air but also frequency (Hz) of a dynamic region linked with the diaphragm or the respiration is changed, such a method enables measurement in the frequency band responding to a change thereof. Then, During spectrum extraction of BPF (band pass filter), in a fixed range, it becomes possible that BBF is set according to each respective state of the respiration; that an optimal state can be caused by variation of an axis at the BPF position in each "reconstruction phase" of the respiration; and that BPF in variability accompanying the foregoing is prepared. Even though a respiratory rhythm varies as when breathing slow or stopping breathing (Hz=0), this enables providing images according to the foregoing.

Further, a frequency of the whole expired air or inspired air may be made to be calculated based on a ratio of the respiratory element to the whole expired air or inspired air. In addition, those for which detecting of the diaphragm is carried out plural times, and a signal and a wave form thereof are stable may be made to be selected. Accordingly, it becomes possible to calculate at least one frequency of the respiratory element from the position or shape of the detected diaphragm, or the position or shape of the dynamic region linked with the respiration. In becomes possible to grasp the frequency of the respiratory element when the position or shape of the diaphragm or the dynamic region is able to be grasped. This method enables tracking the subsequent waveform even though dividing a part of the waveform. Thus, it is possible to follow the original respiratory element even though the frequency of the respiratory element changes on the way. Further, the pulsation of a heart and so forth often undergo a sudden change, but the same thing is also possible to be applied to cardiac blood vessels. Next, the operation of each module according to the present embodiment will be explained.

[Respiratory Function Analysis]

First, the respiratory function analysis will be explained. FIG. 6A is a flowchart showing an outline of the respiratory function analysis according to the present embodiment. The basic module 1 extracts images of DICOM from the database 15 (step S1). Herein, at least a plurality of frame images included within one respiratory cycle are acquired. Next, in each acquired frame image, the cycle of the respiratory element is specified by using the density (density/intensity) in a certain fixed area within at least the lung field (step S2). In addition, the specified respiratory cycle and the waveform specified from this respiratory cycle are possible to be used at each step as described below.

It is also possible to further use the movement of the diaphragm and the movement of the thorax for specifying the cycle of the respiratory element. Further, used may be the range constituted with a certain fixed volume and "density"/ "intensity" measured in the region exhibiting high X-ray permeability, and the data obtained from another measurement method such as spirogram or the like. In addition, the frequency possessed by each organ (a lung in this case) is specified in advance, and "density"/"intensity" corresponding to the specified frequency may be extracted.

Next, in FIG. 6A, the lung field is automatically detected (step S3). The lung contour is continuously changes, and thus if the maximum shape and the minimum shape can be detected, it is possible to interpolate the shape therebetween via calculation. The lung contour in each frame image is specified by interpolating each frame image based on the cycle of the respiratory element specified at step S2. The lung field may be detected by carrying out pattern matching as shown in FIGS. 2E to 2H. In addition, as to the detected lung field, the noise elimination may be carried out by cut-off. Next, the detected lung field is divided into a plurality of block areas (step S4). Then, a change in each block area in each frame image is calculated (step S5). Herein, change values within each block area are averaged and expressed as one piece of data.

In addition, as to the change values within each block area, the noise elimination may be carried out by cut-off. Next, a Fourier analysis or a tunable concordance rate analysis is performed based on the cycle of the above-described respiratory element, for the value of "density"/ "intensity" in each block area and a change amount thereof (step S6).

Next, the noise elimination is carried out for the results obtained by the Fourier analysis or the tunable concordance rate analysis (step S7). Herein, the cut-off as described above and elimination of the artifact can be carried out. The above-described operation from step S5 to step S7 is performed at least once, and whether or not to be completed is determined (step S8). Herein, there are some cases where a frequency tunable image of a high purity element caused by the mixture of a composite wave and other waves, for example, a respiratory element, a blood flow element or another element can not be displayed in one spectrum extraction for a feature amount displayed on a display. At this time, there is a case where all or part of the analysis up to the display for the feature amount as a pixel value is re-performed once more or plural times. It becomes possible to further obtain a high purity image in regard to tunability and concordance of elements, for example, the respiratory element and the blood flow element, by this operation. As to this operation, an operator may perform manually while visually confirming the image on a display, and it may also be automatically performed to recalculate the distribution ratio by extracting a spectrum from the output result. Further, even after the calculation, noise cutting processing, fill-in-the-blank by a least squares method (interpolation), and correction using "density" on the periphery may be carried out according to the situation.

At step S8, when not being completed, a transition is made to step S5; and when being completed, the results obtained by the Fourier analysis or the tunable concordance rate analysis are displayed on the display as a pseudo color image (step S9). In addition, a black and white image may be displayed. There are some cases where the accuracy of data is improved by repeating a plurality of cycles in this manner. Thus, a desired moving image is possible to be displayed. Further, the desired moving image may be obtained by correcting the image displayed on the display.

According to the present embodiment, the desired frequency or frequency band is calculated via calculation thereof, but when viewed as an actual image, a good image is not always displayed.

Accordingly, the following methods are often used.
(1) A method by which several frequency bands are plurally presented, and manually selected.
(2) A method by which several frequency bands are plurally presented to extract a good image via pattern recognition by an AI technique.
(3) The selection is made from a trend and a form of HISTGRAM. That is, the value at a central part of "Histgram" according to a signal of the result tends to increase and the value of "histgram" varies in accordance with the movement, and thus the selection may be made from the trend and the form of HISTGRAM.

[Lung Blood Flow Analysis]

Figure 7:
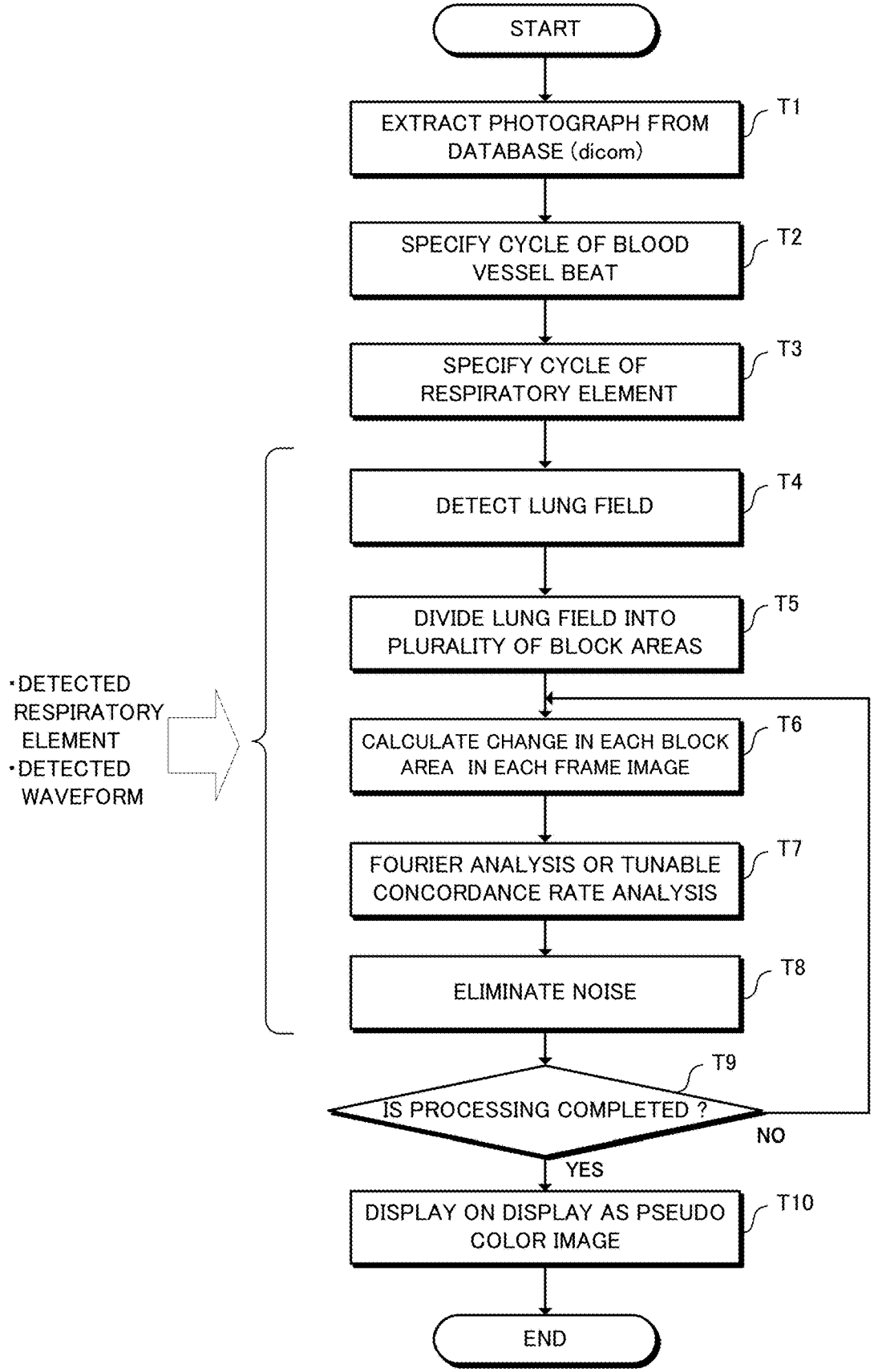
FIG. 7 is a flowchart showing an outline of a lung blood flow analysis according to the present embodiment.

Next, the lung blood flow analysis will be explained. FIG. 7 is a flowchart showing an outline of a lung blood flow analysis according to the present embodiment. The basic module 1 extracts images of DICOM from the database 15 (step T1). Herein, at least a plurality of frame images included within one heartbeat cycle are acquired. Next, the blood vessel beat cycle is specified based on each acquired frame image (step T2). In addition, it is possible to use the specified blood vessel beat cycle and the waveform specified from this blood vessel beat cycle at each step as described below. As to the blood vessel beat cycle, as described above, the blood vessel beat is analyzed using for example, measurement results of an electrocardiogram and other modalities such as a pulsimeter and so forth, and a change in "density"/"intensity" of an arbitrary region such as a heart/ pulmonary hilum/main blood vessels, or the like. In addition, the frequency possessed by each organ (a lung blood flow in this case) is specified in advance, and "density"/ "intensity" corresponding to the specified frequency may be extracted.

Next, in FIG. 7, the cycle of the respiratory element is specified by the above-described method (step T3), and the lung field is automatically detected using the cycle of the respiratory element (step T4). In the automatic detection of the lung contour, variation often occurs for each frame image, but the lung contour in each frame image is specified by interpolating each frame image, based on the cycle of the respiratory element specified at step T3. Further, the lung field may be detected by performing pattern matching as shown in FIGS. 2E to 2H. In addition, the noise elimination may be carried out for the detected lung field by cut-off. Next, the detected lung field is divided into a plurality of block areas (step T5). Then, a change in each block area in each frame image is calculated (step T6). Herein, the value of the change within each block area is averaged and expressed as one piece of data. In addition, the noise elimination may be carried out for the value of the change within each block area by the cut-off. Next, a Fourier analysis or a tunable concordance rate analysis is performed for the value of "density"/"intensity" in each block area or a change amount thereof, based on the above-described blood vessel beat cycle (step T7).

Next, the noise elimination is carried out for the results obtained by the Fourier analysis or the tunable concordance rate analysis (step T8). Herein, the cut-off as described above and elimination of the artifact can be carried out. The above-described operation from step T6 to step T8 is performed at least once, and whether or not to be completed is determined (step T9). Herein, there are some cases where a frequency tunable image of a high purity element caused by the mixture of a composite wave and other waves, for example, a respiratory element, a blood flow element or another element can not be displayed in one spectrum extraction for a feature amount displayed on a display. At this time, there is a case where all or part of the analysis up to the display for the feature amount as a pixel value is re-performed once more or plural times. It becomes possible to further obtain a high purity image in regard to tunability and concordance of elements, for example, the respiratory element and the blood flow element, by this operation. As to this operation, an operator may perform manually while visually confirming the image on a display, and it may also be automatically performed to recalculate the distribution ratio by extracting a spectrum from the output result. Further, even after the calculation, noise cutting processing, fill-in-the-blank by a least squares method (interpolation), and correction using "density" on the periphery may be carried out according to the situation.

At step T9, when not being completed, a transition is made to step T6; and when being completed, the results obtained by the Fourier analysis or the tunable concordance rate analysis are displayed on the display as a pseudo color image (step T10). In addition, a black and white image may be displayed. By doing this, it becomes possible to improve the accuracy of data. Further, the desired moving image may be obtained by correcting the image displayed on the display.

According to the present embodiment, the desired frequency or frequency band is calculated via calculation thereof, but when viewed as an actual image, a good image is not always displayed. Accordingly, the following methods are often used.

(1) A method by which several frequency bands are plurally presented, and manually selected.

(2) A method by which several frequency bands are plurally presented to extract a good image via pattern recognition by an AI technique.

(3) The selection is made from a trend and a form of HISTGRAM. That is, the value at a central part of "Histgram" according to a signal of the result tends to increase and the value of "histgram" varies in accordance with the movement, and thus the selection may be made from the trend and the form of HISTGRAM.

[Another Blood Flow Analysis]

Figure 8:
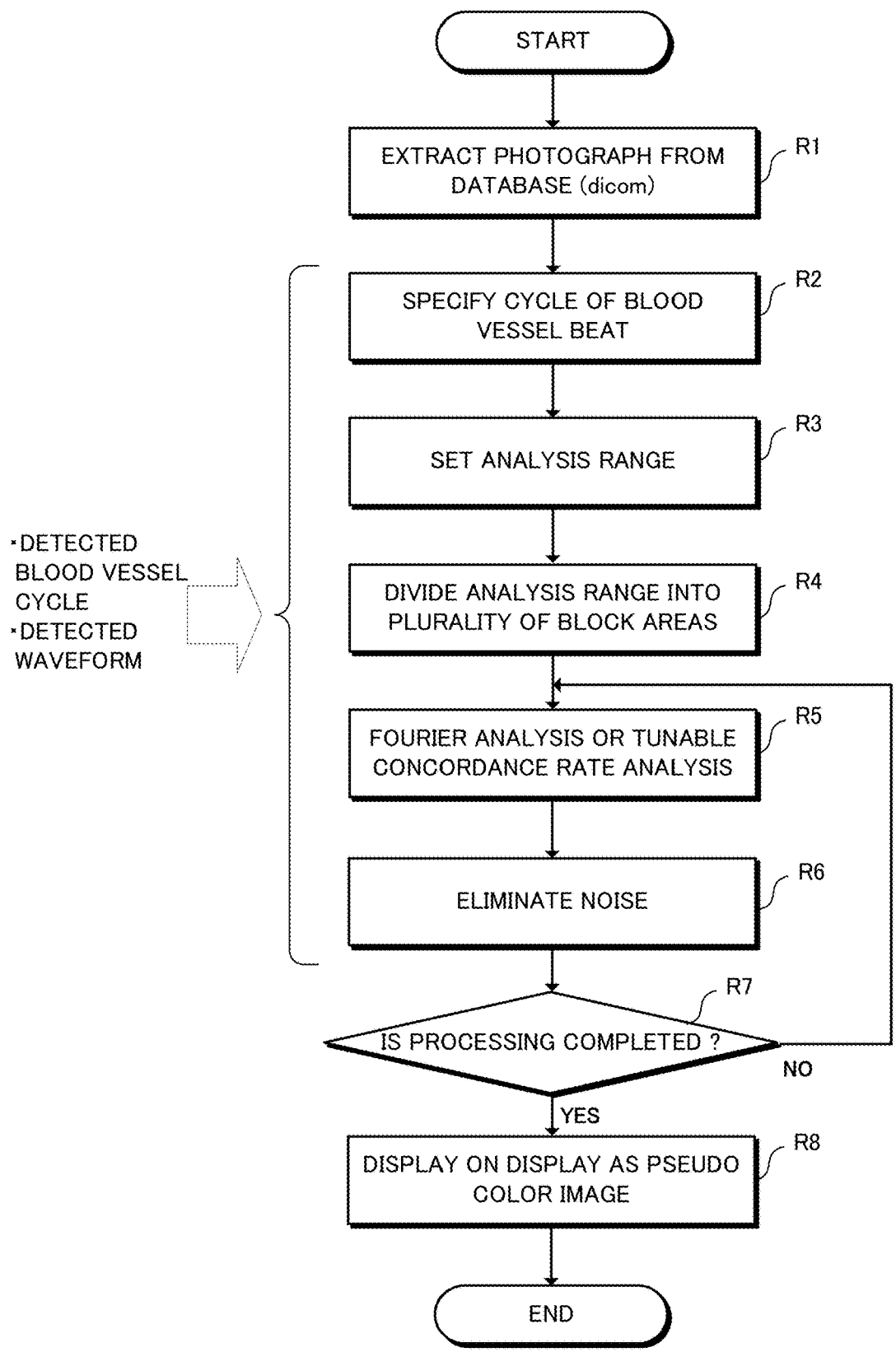
FIG. 8 is a flowchart showing an outline of another blood flow analysis according to the present embodiment.
Figure 15:
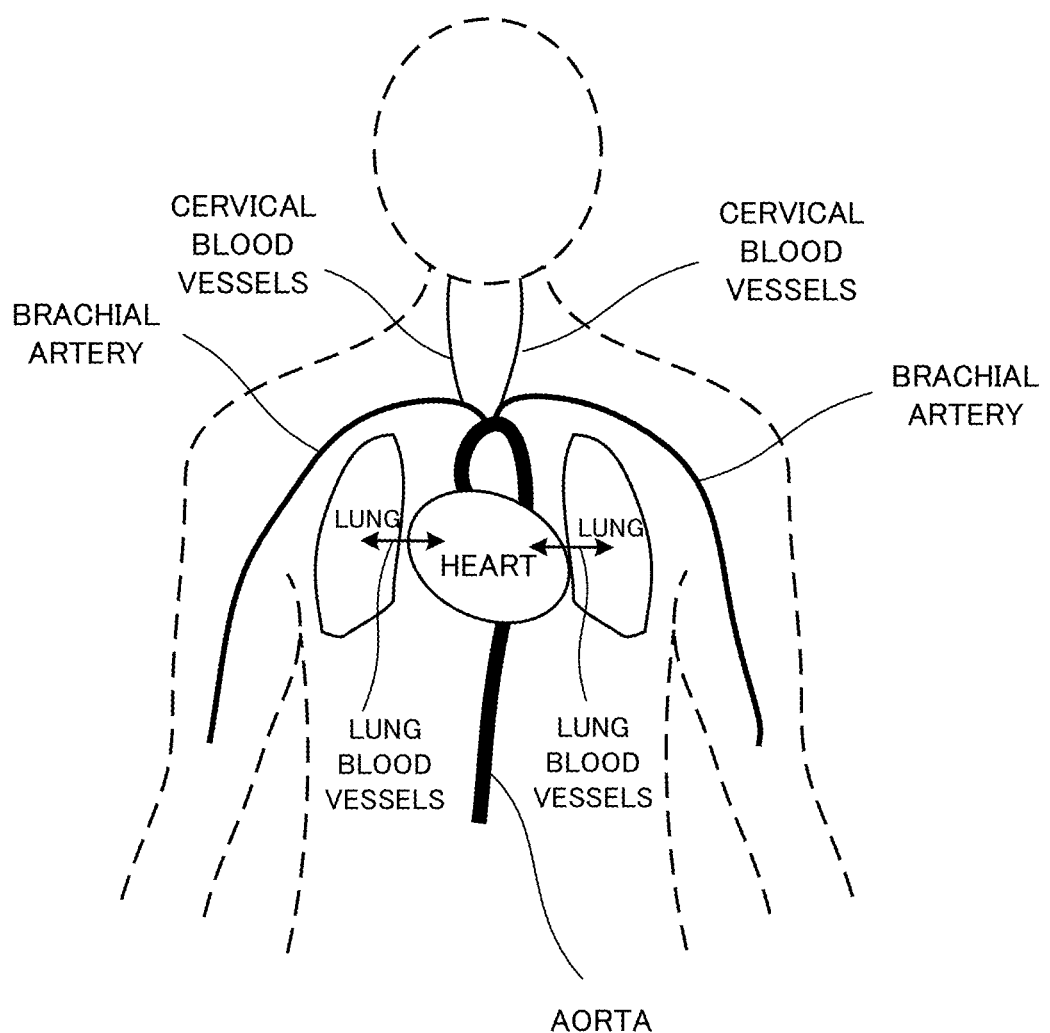
FIG. 15 is a diagram schematically showing an outline configuration of blood vessels of a human body.

Next, another blood flow analysis will be explained. As shown in FIG. 15, it is also possible to apply one aspect according to the present invention to the blood flow analysis of a heart, an aorta, lung blood vessels, a brachial artery, cervical blood vessels, or the like. Further, the blood flow analysis is also similarly applicable to abdominal blood vessels, peripheral blood vessels, and so forth that are not shown in the diagram. FIG. 8 is a flowchart showing an outline of another blood flow analysis according to the present embodiment. The basic module 1 extracts images of DICOM from the database 15 (step R1). Herein, at least a plurality of frame images included within one heartbeat cycle are acquired. Next, the blood vessel beat cycle is specified based on each acquired frame image (step R2). In addition, the specified blood vessel beat cycle and the waveform specified from this blood vessel beat cycle are possible to be used at each step as described below. As to the blood vessel beat cycle, as described above, the blood vessel beat is analyzed using for example, measurement results of an electrocardiogram and other modalities such as a pulsimeter and so forth, and a change in "density"/"intensity" of an arbitrary region such as a heart/pulmonary hilum/main blood vessels, or the like. In addition, the frequency possessed by each organ (for example, main blood vessels) is specified in advance, and "density"/"intensity" corresponding to the specified frequency may be extracted.

Next, an analysis range that is set (step R3), and the analysis range that has been set is divided into a plurality of block areas (step R4). Then, the value of the change within each block area is averaged and expressed as one piece of data. In addition, the noise elimination may be carried out for the value of the change within each block area by the cut-off. Next, a Fourier analysis or a tunable concordance rate analysis is performed based on the above-described blood vessel beat cycle, for the value of "density"/"intensity" in each block area and a change amount thereof (step R5).

Next, the noise elimination is carried out for the results obtained by the Fourier analysis or the tunable concordance rate analysis (step R6). Herein, the cut-off as described above and elimination of the artifact can be carried out. The above-described operation from step R5 to step R6 is performed at least once, and whether or not to be completed is determined (step R7). Herein, there are some cases where a frequency tunable image of a high purity element caused by the mixture of a composite wave and other waves, for example, a respiratory element, a blood flow element or another element can not be displayed in one spectrum extraction for a feature amount displayed on a display. At this time, there is a case where all or part of the analysis up to the display for the feature amount as a pixel value is re-performed once more or plural times. It becomes possible to further obtain a high purity image in regard to tunability and concordance of elements, for example, the respiratory element and the blood flow element, by this operation. As to this operation, an operator may perform manually while visually confirming the image on a display, and it may also be automatically performed to recalculate the distribution ratio by extracting a spectrum from the output result. Further, even after the calculation, noise cutting processing, fill-in-the-blank by a least squares method (interpolation), and correction using "density" on the periphery may be carried out according to the situation.

At step R7, when not being completed, a transition is made to step R5; and when being completed, the results obtained by the Fourier analysis or the tunable concordance rate analysis are displayed on the display as a pseudo color image (step R8). In addition, a black and white image may be displayed. By doing this, it becomes possible to improve the accuracy of data. Further, the desired moving image may be obtained by correcting the image displayed on the display.

According to the present embodiment, the desired frequency or frequency band is calculated via calculation thereof, but when viewed as an actual image, a good image is not always displayed. Accordingly, the following methods are often used.

(1) A method by which several frequency bands are plurally presented, and manually selected.

(2) A method by which several frequency bands are plurally presented to extract a good image via pattern recognition by an AI technique.

(3) The selection is made from a trend and a form of HISTGRAM. That is, the value at a central part of "Histgram" according to a signal of the result tends to increase and the value of "histgram" varies in accordance with the movement, and thus the selection may be made from the trend and the form of HISTGRAM.

In addition, in the case of performing an analysis with 3D, it becomes possible to calculate a respiratory amount, a cardiac output, and a central blood flow amount in each block area from the Fourier analysis result as a relative value by measuring the respiratory amount, the cardiac output, and the central blood flow amount by another device. That is, in the case of a respiratory function analysis, it becomes possible to estimate a lung ventilation amount from a respiratory amount; in the case of a lung blood flow analysis, it becomes possible to estimate a lung blood flow amount from a cardiac (lung blood vessels) output; and in the case of another blood flow amount analysis, it becomes possible to estimate an estimated blood flow amount (rate) in bifurcated blood vessels drawn from the blood flow amount (rate) on the center side.

Further, as described above, the determination is possible to be made with higher accuracy if the entire acquired database can be calculated, but time is often required in executing a computer analysis. Thus, it is enabled to carry out calculation by extracting only an arbitrary number thereof (for example, a specific phase). By doing this, the analysis time can be reduced, and it is further possible to cut irregular places as observed at the beginning of respiration. Further, when displaying the analysis result, an arbitrary range can be displayed. For example, a so-called "endless reproduction" is enabled during the repetitive reproduction, and it becomes possible to easily perform a diagnosis with a doctor by displaying a range of a change of "expired air/inspired air" from the change of "expired air/inspired air".

As has been described above, according to the present embodiment, it becomes possible to evaluate images of a human body with an X-ray moving image device. If digital data can be obtained, it is possible to be calculated with existing facility devices in a generally excellent manner, and thus installation cost is reduced. For example, according to the X-ray moving image device provided with a Flat panel detector, it becomes possible to simply complete the examination of a subject. Further, screening of pulmonary thrombosis embolism becomes possible for a lung blood flow. For example, according to the X-ray moving image device provided with the Flat panel detector, useless examinations can be eliminated by executing a diagnostic support program according to the present embodiment before performing CT. Further, the simple examination is carried out, and thus it becomes possible to find a disease with high urgency at an early stage and to preferentially treat it. According to the photographing method at present, in the case of another modality such as CT, MR or the like, there are some problems, but a detailed diagnosis in each area is enabled if the foregoing matters can be solved.

Further, it is also applicable to screening of various kinds of blood vessels, for example, cervical blood flow narrowing; and is also applicable to the blood flow evaluation and screening of large blood vessels. Further, as to lung respiration data, it is enabled as a partial function examination of a lung, and becomes possible to be used as a lung function examination. Further, it is also enabled to identify a disease such as COPD, emphysema or the like. It is also possible to be applied for grasping characteristic conditions before and after surgery. Further, by Fourier-transforming a cycle of a respiratory element and a blood flow cycle to eliminate a respiration waveform and a blood flow waveform, in an X-ray image of an abdomen, it is possible to observe abnormality in remaining biological movement, for example, intestinal tract ileus or the like.

In addition, when an image acquired at first exhibits high resolution to a certain extent, there are provided a large number of pixels, and thus it often takes time for calculation. In this case, the calculation may be made after reducing the image to a fixed number of pixels. For example, the calculation time is possible to be suppressed via the calculation made after reducing pixels of [4096×4096] to pixels of [1024×1024.].

[Others]

In addition, when photographing an X-ray image, for example, used can be a predictive algorithm such as an AR method (Autoregressive Moving average model) and so forth. When at least one frequency of the respiratory element can be identified, it is also possible to control an X-ray photographing device so as to adjust an irradiation interval of X-rays according to this frequency. For example, in the case of a low frequency of the respiration element (in the case of a long cycle), the number of X-ray photographing times can be reduced. By doing this, it becomes possible to reduce an amount of radiation exposure to a human body. In addition, in the case of high frequency of the respiration element or the cardiovascular beat element such as tachypnea, tachycardia or the like (in the case of a short cycle), an optimal image may be prepared by enhancing irradiation frequency.

Further, according to a DICOM data storage format, quality in compressed image is often degraded, and thus it is preferred to be stored so as not to be compressed. Further, the calculation method may be changed according to a data compression format.

EXPLANATION OF THE SYMBOLS 1 basic module
3 respiratory function analysis unit
5 lung blood flow analysis unit
7 another blood flow analysis unit
9 Fourier analysis unit
10 waveform analysis unit
11 visualization/digitization unit
13 input interface
15 database
17 output interface
19 display

The invention claimed is:

1. A diagnostic support system for analyzing human body images and displaying the analysis results, comprising:
an input interface that acquires a plurality of frame images;
a control unit that:
identifies at least one frequency of a respiratory element, which includes all or part of the exhalation or inhalation, based on the pixels of a specific region of each frame image;
detects lung fields from the acquired plurality of frame images;
divides the detected lung fields into a plurality of block regions, and calculates the image changes in the block regions for each frame image;
performs a Fourier transform on the image changes of each block region in each frame image;
extracts spectra from the Fourier transformed spectra, which are within a certain bandwidth and correspond to at least one frequency of the respiratory element, or weights specific spectra by applying coefficients;
performs an inverse Fourier transform on the spectra extracted from the certain bandwidth;
and generates images between frames based on the frequency of the respiratory element and each frame image.

2. The diagnostic support system according to claim 1, wherein the spectrum extracted from the certain bandwidth of the Fourier transformed spectra using a filter includes spectra containing noise frequencies, frequencies other than the respiratory element frequencies obtained from the frame images, or frequencies corresponding to the input frequency or frequency band.

3. The diagnostic support system according to claim 1, wherein the change rate of the pixels in the block regions of each frame image is calculated, and only the block regions where the synchronization rate, which is the ratio of the pixel change rate to the change rate of the dynamic part associated with respiration, falls within a predetermined range are extracted.

4. The diagnostic support system according to claim 3, wherein at least one frequency of a cardiovascular element extracted from the subject's heartbeat or at least one frequency of a vascular pulse element extracted from the vascular pulse is identified.

5. The diagnostic support system according to claim 3, wherein the logarithm value of the synchronization rate is defined as a certain range including zero.

6. The diagnostic support system according to claim 1, wherein the respiratory element is corrected by changing the phase of at least one frequency of the respiratory element or smoothing the waveform of the respiratory element.

7. The diagnostic support system according to claim 1, wherein only blocks with relatively high amplitude values are extracted and displayed after the inverse Fourier transform.

8. A diagnostic support system for analyzing human body images and displaying the analysis results, comprising:
an input interface that acquires a plurality of frame images;
a control unit that:
identifies at least one frequency of a cardiovascular element extracted from the subject's heartbeat or vascular pulse;
identifies at least one frequency of a respiratory element, which includes all or part of the exhalation or inhalation, based on the pixels of a specific region of each frame image;
detects lung fields from the acquired plurality of frame images;
divides the detected lung fields into a plurality of block regions, and calculates the image changes in the block regions for each frame image;
performs a Fourier transform on the image changes of each block region in each frame image;
extracts spectra from the Fourier transformed spectra, which are within a certain bandwidth and correspond to at least one frequency of the cardiovascular element, or weights specific spectra by applying coefficients;
performs an inverse Fourier transform on the spectra extracted from the certain bandwidth, and
generates images between frames based on the frequency of the cardiovascular element and each frame image.

9. The diagnostic support system according to claim 8, wherein the spectrum extracted from the certain bandwidth of the Fourier transformed spectra using a filter includes spectra containing noise frequencies, frequencies other than the cardiovascular element frequencies obtained from the frame images, or frequencies corresponding to the input frequency or frequency band.

10. A diagnostic support system for analyzing human body images and displaying the analysis results, comprising:
an input interface that acquires a plurality of frame images;
identifies at least one frequency of a cardiovascular element extracted from the subject's heartbeat or vascular pulse;
detects lung fields from the acquired plurality of frame images;
divides the detected lung fields into a plurality of block regions, and calculates the image changes in the block regions for each frame image;
performs a Fourier transform on the image changes of each block region in each frame image;
extracts spectra from the Fourier transformed spectra, which are within a certain bandwidth and correspond to at least one frequency of the cardiovascular element, or weights specific spectra by applying coefficients;
performs an inverse Fourier transform on the spectra extracted from the certain bandwidth, and
generates images between frames based on the frequency of the cardiovascular element and each frame image.

11. A diagnostic support system for analyzing human body images and displaying the analysis results, comprising:
an input interface that acquires a plurality of frame images;
a control unit that:
identifies at least one frequency of a vascular pulse element extracted from the subject's vascular pulse;
divides the analysis range set for each frame image into a plurality of block regions, and calculates the image changes in the block regions for each frame image;
performs a Fourier transform on the image changes of each block region in each frame image;
extracts spectra from the Fourier transformed spectra, which are within a certain bandwidth and correspond to at least one frequency of the vascular pulse element, or weights specific spectra by applying coefficients;
performs an inverse Fourier transform on the spectra extracted from the certain bandwidth, and
generates images between frames based on the frequency of the vascular pulse element and each frame image.

12. The diagnostic support system according to claim 11, wherein the spectrum extracted from the certain bandwidth of the Fourier transformed spectra using a filter includes spectra containing noise frequencies, frequencies other than the vascular pulse element frequencies obtained from the frame images, or frequencies corresponding to the input frequency or frequency band.

* * * * *